United States Patent
Hegland et al.

(10) Patent No.: US 9,357,038 B2
(45) Date of Patent: May 31, 2016

(54) LOSSLESS CONNECTION FAILOVER FOR MIRRORED DEVICES

(71) Applicant: Brocade Communications Systems, Inc., San Jose, CA (US)

(72) Inventors: Ryan Hegland, Champlin, MN (US); Amr Sabaa, Sunnyvale, CA (US); Siva Adiraju, Fremont, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 691 days.

(21) Appl. No.: 13/677,922

(22) Filed: Nov. 15, 2012

(65) Prior Publication Data

US 2013/0332573 A1 Dec. 12, 2013

Related U.S. Application Data

(60) Provisional application No. 61/567,282, filed on Dec. 6, 2011.

(51) Int. Cl.
*G06F 15/16* (2006.01)
*H04L 29/06* (2006.01)
*H04L 29/14* (2006.01)

(52) U.S. Cl.
CPC .............. *H04L 69/163* (2013.01); *H04L 69/14* (2013.01); *H04L 69/40* (2013.01)

(58) Field of Classification Search
CPC ......... H04L 45/22; H04L 45/28; H04L 67/14; H04L 69/40; H04L 41/0896; H04L 47/2441; H04L 1/188; G06F 11/2056
USPC .............. 370/220, 221, 225, 236.1, 392, 252, 370/389; 714/4; 707/204; 709/224
See application file for complete search history.

(56) References Cited

U.S. PATENT DOCUMENTS

| | | | |
|---|---|---|---|
| 6,687,222 B1 | 2/2004 | Albert et al. | |
| 6,967,927 B1 * | 11/2005 | Dugeon et al. | 370/236.1 |
| 7,197,661 B1 | 3/2007 | Reynolds et al. | |
| 7,978,598 B1 * | 7/2011 | Majee | 370/225 |
| 8,793,361 B1 * | 7/2014 | Riddle | H04L 47/2441 709/224 |
| 2005/0074007 A1 * | 4/2005 | Samuels et al. | 370/392 |
| 2006/0159011 A1 * | 7/2006 | Dalal et al. | 370/220 |
| 2006/0218210 A1 | 9/2006 | Sarma et al. | |
| 2008/0253301 A1 * | 10/2008 | Keromytis | H04L 41/0896 370/252 |
| 2009/0296568 A1 * | 12/2009 | Kitada | 370/221 |
| 2012/0155458 A1 * | 6/2012 | Larson | H04L 1/188 370/389 |

OTHER PUBLICATIONS

European Search Report received in co-pending EP Application No. 12855672.7 dated Nov. 20, 2014, 6 pages.

* cited by examiner

*Primary Examiner* — Dustin Nguyen
(74) *Attorney, Agent, or Firm* — Blank Rome, LLP

(57) ABSTRACT

The WAN optimization devices delay ACK until the ACK is actually received from the target while opening up the TCP window. When the ACK is received and forwarded, the TCP window is reduced in size. If there are mirrored WAN optimization devices, the original WAN optimization device sends the datagram across the WAN and at the same time sends the datagram to the mirroring WAN optimization device. When the mirroring WAN optimization device ACKs the mirrored datagram, the original WAN optimization device ACKs the host. When the ACK across the WAN is received, the mirroring WAN optimization device gets the ACK forwarded and deletes the mirrored datagram. On a loss of a device, the TCP connection transitions to the mirroring WAN optimization device, which closes the LAN TCP window and transmits all un-ACKed data. Then upon success the mirroring WAN optimization device reopens the LAN TCP window.

14 Claims, 18 Drawing Sheets

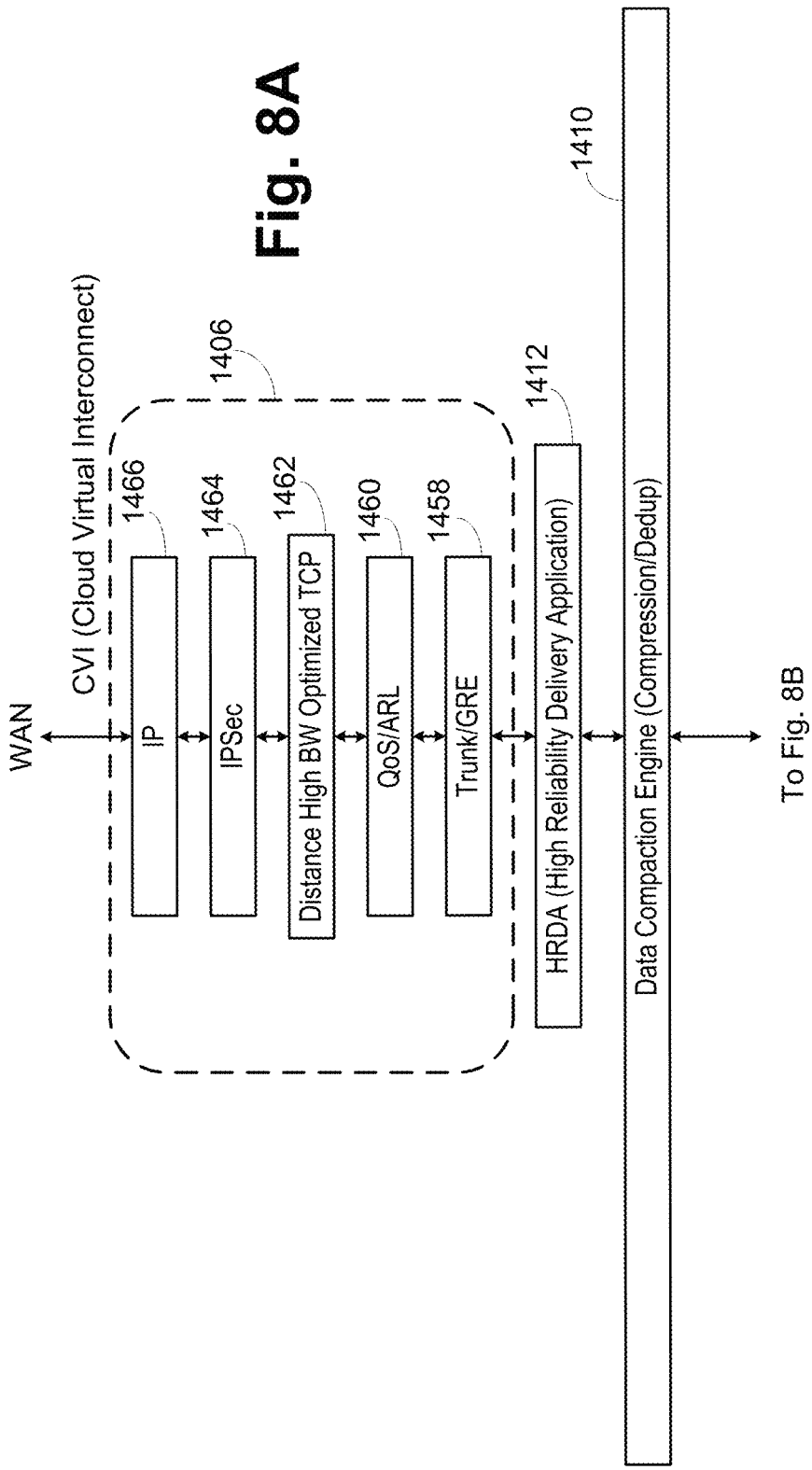

LOSSLESS CONNECTION FAILOVER FOR MIRRORED DEVICES

CROSS REFERENCE TO RELATED APPLICATIONS

This application claims the benefit under 35 U.S.C. §119 (e) of U.S. Provisional Patent Application Ser. No. 61/567, 282 entitled "Lossless Connection Failover for Single and Mirrored Devices," filed Dec. 6, 2011, which is hereby incorporated by reference.

This application is also related to U.S. patent application Ser. No. 13/677,929, now U.S. Pat. No. 9,118,594, entitled "Lossless Connection Failover for Single Devices", Ser. No. 13/677,909, entitled "TCP Connection Relocation", Ser. No. 13/678,032, now U.S. Pat. No. 9,270,609, entitled "Transmission Control Protocol Window Size Adjustment For Out-Of-Order Protocol Data Removal", all three filed concurrently herewith, which are hereby incorporated by reference.

BACKGROUND OF THE INVENTION

1. Field of the Invention

The invention relates to network devices, and more particularly to failures of network devices.

2. Description of the Related Art

A WAN optimization device may do a local TCP acknowledgement from the local WAN optimization device closest to the client. The local WAN optimization device buffers the data and delivers it to a remote WAN optimization device that in turn sends it to the server. A problem develops if a WAN optimization device fails the data that has already been acknowledged using the local TCP acknowledge. That data will be lost and cannot be recovered.

SUMMARY OF THE INVENTION

In certain embodiments according to the present invention, the WAN optimization devices do not do local or early ACK, which can cause data loss. Instead, the WAN optimization devices delay ACK until the ACK is actually received from the target but open up the TCP window to allow improved flow from the client without throttling issues. As an example, if the connection starts with 64K windows and 32K of data is received, the TCP window would normally be 32K. The WAN optimization device will delay acknowledging the data and will open the TCP window again to be 64K. When the ACK is finally received and forwarded, the TCP window is reduced in size to the proper size, which would be 64K in this example.

A second embodiment according to the present invention can be used if there are mirrored CNE/LDCM devices, a form of WAN optimization devices. In this embodiment the host CNE/LDCM device sends the datagram across the WAN and at the same time sends the datagram to the mirroring CNE/LDCM device. When the mirroring CNE/LDCM device ACKs the mirrored datagram, the original CNE/LDCM device ACKs the host, which is a short time versus the WAN latency. When the ACK across the WAN is received, the mirroring CNE/LDCM device gets the ACK forwarded from the host CNE/LDCM device and deletes the mirrored datagram. On a loss of a device, the TCP connection transitions to the mirroring CNE/LDCM device, the mirroring CNE/LDCM device recognizes this, closes the LAN TCP window, and transmits all un-ACKed data. Then upon success of that, the mirroring CNE/LDCM device reopens the LAN TCP window, allowing data to continue.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIGS. 8A and 8B are block diagrams of the functional blocks of the LDCM appliance of FIG. 6.

DETAILED DESCRIPTION OF THE PREFERRED EMBODIMENTS

Figure 1:
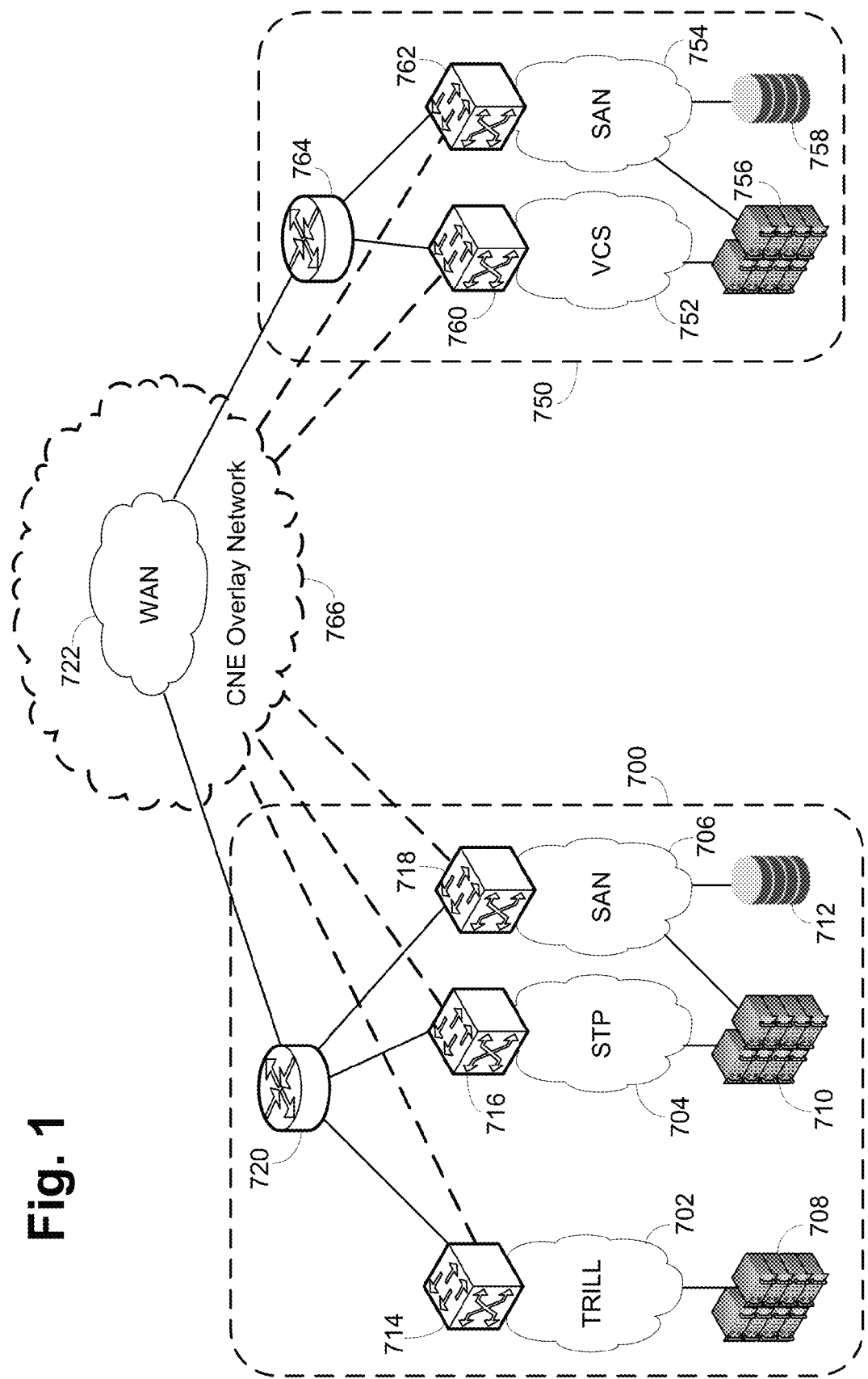
FIG. 1 is a block diagram of an embodiment two connected data centers according to the present invention.

Referring to FIG. 1, a network illustrating portions according to the present invention is shown. A first data center 700 is shown having three separate internal networks, a TRILL network 702, a normal Ethernet spanning tree protocol (STP) network 704 and a storage area network (SAN) 706. Application servers 708 are connected to the TRILL network 702, while application servers 710 are connected to the STP network 704 and the SAN 706. Storage 712 is shown connected to the SAN 706. Each of the networks 702, 704 and 706 has a converged network extension (CNE) device 714, 716, 718 connected. The CNE devices 714, 716, 718 are connected to a router 720, which in turn is connected to a WAN 722. A second data center 750 is similar, having a VCS Ethernet fabric network 752 and a SAN 754. Application servers 756 are connected to each network 752 and 754, with storage connected to the SAN 754. CNE devices 760, 762 are connected to each network 752, 754 and to a router 764, which is also connected to the WAN 722 to allow the data centers 700, 750 to communicate. The operation of the CNE devices 714-718 and 760-762 result in an effective CNE overlay network 766, with virtual links from each CNE device to the CNE overlay network 766.

One goal of the embodiments of the present invention is to extend a VCS and TRILL network across data centers and meet the scalability requirements needed by the deployments. A CNE device can be implemented in a two-box solution, wherein one box is capable of L2/L3/FCoE switching and is part of the VCS, and the other facilitates the WAN tunneling to transport Ethernet and/or FC traffic over WAN. The CNE device can also be implemented in a one-box solution, wherein a single piece of network equipment combines the functions of L2/L3/FCoE switching and WAN tunneling.

VCS as a layer-2 switch uses TRILL as its inter-switch connectivity and delivers a notion of single logical layer-2 switch. This single logical layer-2 switch delivers a transparent LAN service. All the edge ports of VCS support standard protocols and features like Link Aggregation Control Protocol (LACP), Link Layer Discovery Protocol (LLDP), VLANs, MAC learning, etc. VCS achieves a distributed MAC address database using Ethernet Name Service (eNS) and attempts to avoid flooding as much as possible. VCS also provides various intelligent services, such as virtual link aggregation group (vLAG), advance port profile management (APPM), End-to-End FCoE, Edge-Loop-Detection, etc. More details on VCS are available in U.S. patent application Ser. No. 13/098,360, now U.S. Pat. No. 8,625,616, entitled "Converged Network Extension," filed Apr. 29, 2011; Ser. No. 12/725,249, now U.S. Pat. No. 8,665,886, entitled "Redundant Host Connection in a Routed Network," filed 16 Mar. 2010; Ser. No. 13/087,239, now U.S. Pat. No. 8,867,552, entitled "Virtual Cluster Switching," filed 14 Apr. 2011; Ser. No. 13/092,724, now U.S. Pat. No. 9,001,824, entitled "Fabric Formation for Virtual Cluster Switching," filed 22 Apr. 2011; Ser. No. 13/092,580, entitled "Distributed Configuration Management for Virtual Cluster Switching," filed 22 Apr. 2011; Ser. No. 13/042,259, entitled "Port Profile Management for Virtual Cluster Switching," filed 7 Mar. 2011; Ser. No. 13/092,460, entitled "Advanced Link Tracking for Virtual Cluster Switching," filed 22 Apr. 2011; Ser. No. 13/092,701, now U.S. Pat. No. 8,989,186, entitled "Virtual Port Grouping for Virtual Cluster Switching," filed 22 Apr. 2011; Ser. No. 13/092,752, entitled "Name Services for Virtual Cluster Switching," filed 22 Apr. 2011; Ser. No. 13/092,877, entitled "Traffic Management for Virtual Cluster Switching," filed 22 Apr. 2011; and Ser. No. 13/092,864, now U.S. Pat. No. 8,446,914, entitled "Method and System for Link Aggregation Across Multiple Switches," filed 22 Apr. 2011, all hereby incorporated by reference.

In embodiments of the present invention, for the purpose of cross-data-center communication, each data center is represented as a single logical RBridge. This logical RBridge can be assigned a virtual RBridge ID or use the RBridge ID of the CNE device that performs the WAN tunneling.

Figure 2:
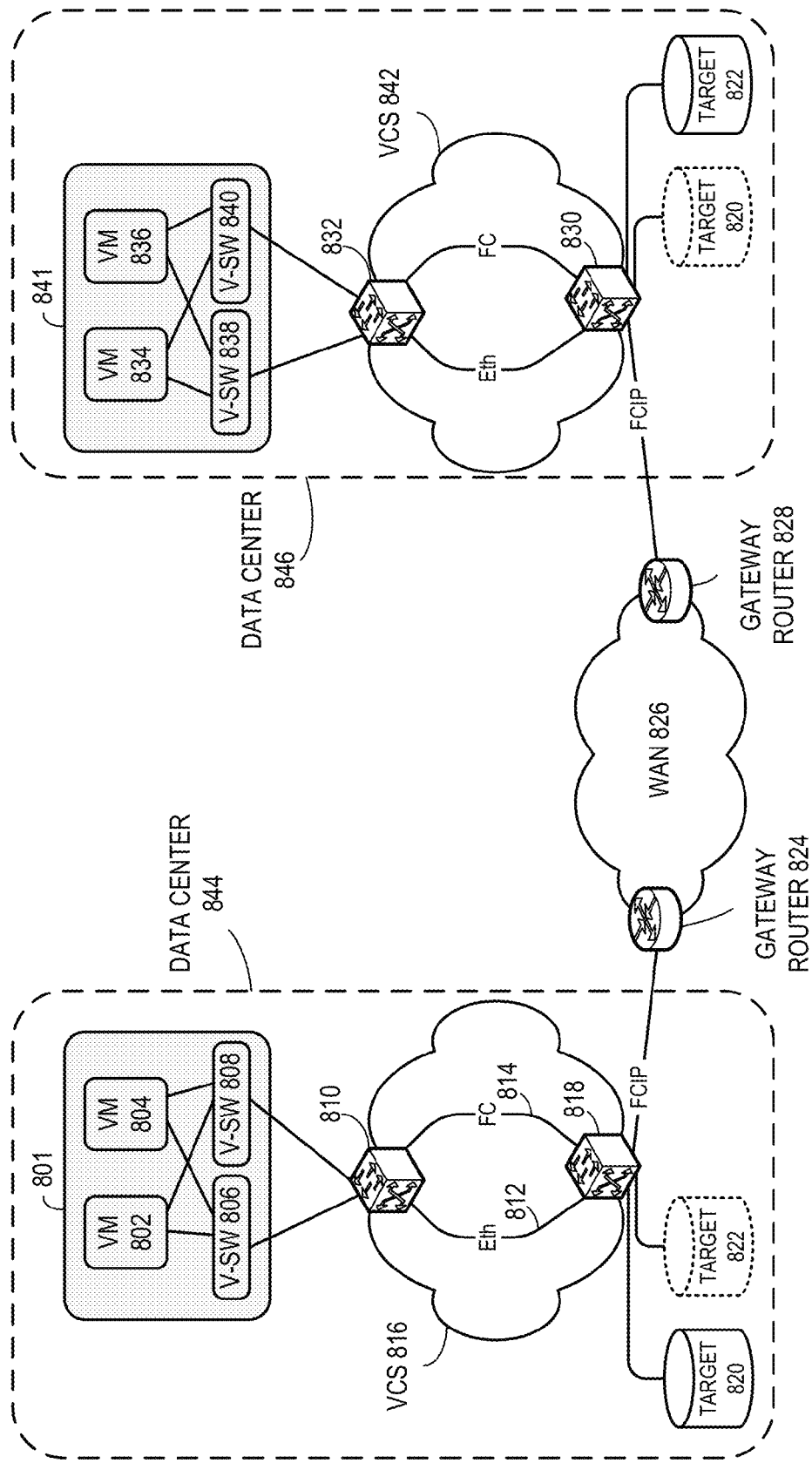
FIG. 2 illustrates an exemplary network architecture which includes CNE devices for facilitate cross-data-center communications, in accordance with one embodiment of the present invention.

FIG. 2 illustrates an exemplary network architecture which includes CNE devices for facilitate cross-data-center communications, in accordance with one embodiment of the present invention. In this example, two data centers 844 and 846 are coupled to a WAN 826 via gateway routers 824 and 828, respectively. Data center 844 includes a VCS 816, which couples to a number of hosts, such as host 801, via its member switches, such as switch 810. Host 801 includes two VMs 802 and 804, which are coupled to virtual switches 806 and 808 in a dual-homing configuration. In one embodiment, virtual switches 806 and 808 reside on two network interface cards on host 801. Virtual switches 806 and 808 are coupled to VCS member switch 810. Also included in VCS 816 is a CNE device 818. CNE device 818 is configured to receive both Ethernet (or TRILL) traffic from member switch 810 via an Ethernet (or TRILL) link 812, and FC traffic via FC link 814. Also coupled to CNE device 818 is a target storage device 820, and a cloned target storage device 822 (denoted by dotted lines). CNE device 818 maintains an FCIP tunnel to data center 846 across WAN 826 via gateway routers 824 and 828.

Similarly, data center 846 includes a VCS 842, which in turn includes a member switch 832. Member switch 832 is coupled to a host 841, which includes VMs 834 and 836, both of which are coupled to virtual switches 838 and 840. Also included in VCS 842 is a CNE device 830. CNE device is coupled to member switch 832 via an Ethernet (TRILL) link and an FC link. CNE device 830 is also coupled to target storage device 822 and a clone of target storage device 820.

During operation, assume that VM 802 needs to move from host 801 to host 841. Note that this movement is previously not possible, because virtual machines are visible only within the same layer-2 network domain. Once the layer-2 network domain is terminated by a layer-3 device, such as gateway router 824, all the identifying information for a particular virtual machine (which is carried in layer-2 headers) is lost. However, in embodiments of the present invention, because CNE device extends the layer-2 domain from VCS 816 to VCS 842, the movement of VM 802 from data center 844 to data center 846 is now possible as that fundamental requirement is met.

When forwarding TRILL frames from data center 844 to data center 846, CNE device 818 modifies the egress TRILL frames' header so that the destination RBridge identifier is the RBridge identifier assigned to data center 846. CNE device 818 then uses the FCIP tunnel to deliver these TRILL frames to CNE device 830, which in turn forwards these TRILL frames to their respective layer-2 destinations.

VCS uses FC control plane to automatically form a fabric and assign RBridge identifiers to each member switch. In one embodiment, the CNE architecture keeps the TRILL and SAN fabrics separate between data centers. From a TRILL point of view, each VCS (which corresponds to a respective data center) is represented as a single virtual RBridge. In addition, the CNE device can be coupled to a VCS member switch with both a TRILL link and an FC link. The CNE device can join the VCS via a TRILL link. However, since the CNE devices keeps the TRILL VCS fabric and SAN (FC) fabric separate, the FC link between the CNE device and the member switch is configured for FC multi-fabric.

Figure 3:
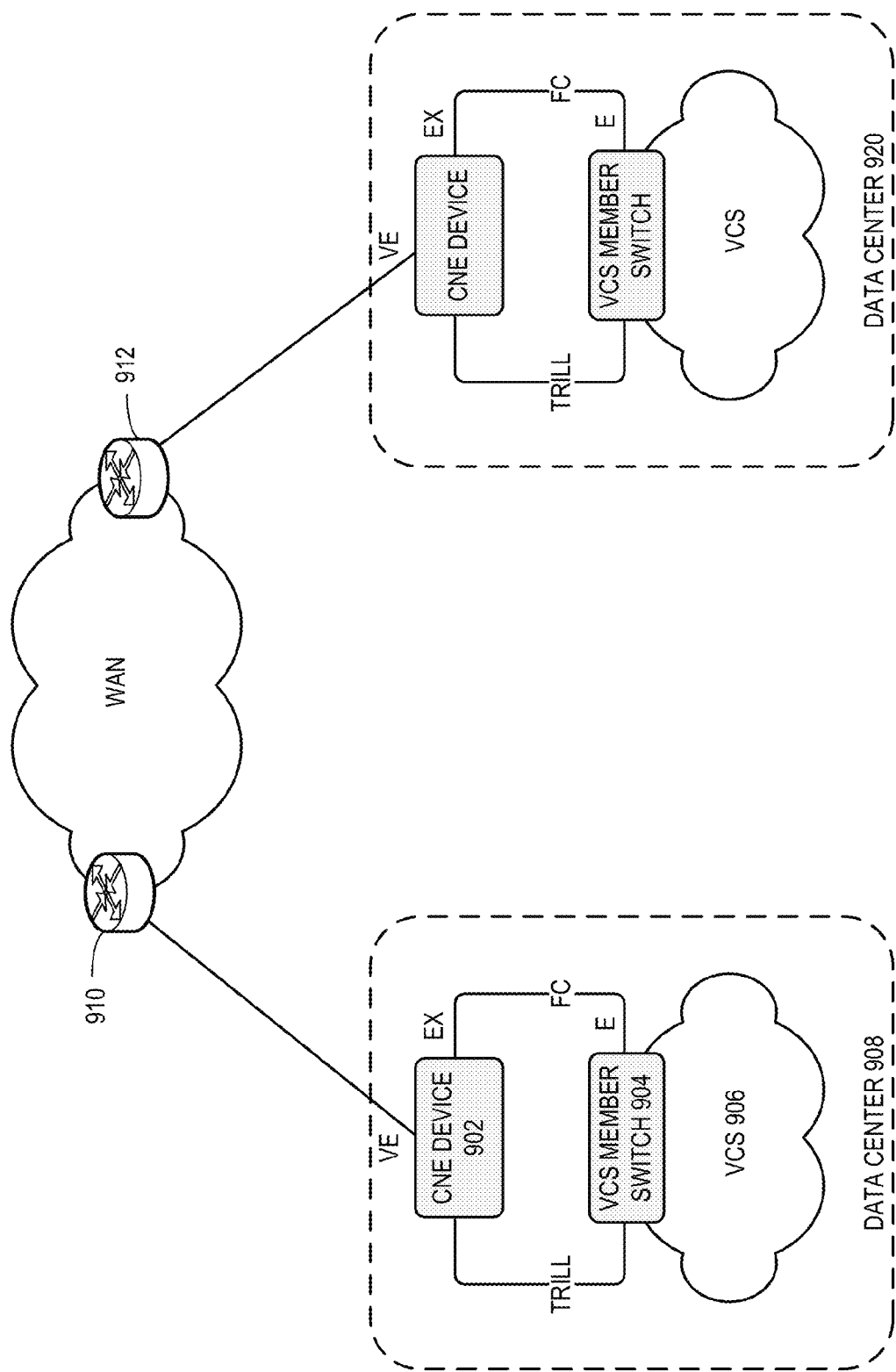
FIG. 3 illustrates an exemplary implementation of CNE-enabled VCSs, in accordance with one embodiment of the present invention.

As illustrated in FIG. 3, a data center 908 is coupled to a WAN via a gateway router 910, and a data center 920 is coupled to the WAN via a gateway router 912. Data center 908 includes a VCS 906, which includes a member switch 904. Also included in data center 908 is a CNE device 902. CNE device 902 is coupled to VCS member switch 904 via a TRILL link and an FC link. CNE device 902 can join the VCS via the TRILL link. However, the FC link allows CNE device 902 to maintain a separate FC fabric with VCS member switch 904 to carry FC traffic. In one embodiment, the FC port on CNE device 902 is an FC EX_port. The corresponding port on member switch 904 is an FC E_port. The port on CNE device 902 on the WAN side (coupling to gateway router 910) is an FCIP VE_port. Data center 920 has a similar configuration.

In one embodiment, each data center's VCS includes a node designated as the ROOT RBridge for multicast purposes. During the initial setup, the CNE devices in the VCSs exchange each VCS's ROOT RBridge identifier. In addition, the CNE devices also exchange each data center's RBridge identifier. Note that this RBridge identifier represents the entire data center. Information related to data-center RBridge identifiers is distributed as a static route to all the nodes in the local VCS.

Figure 4A:
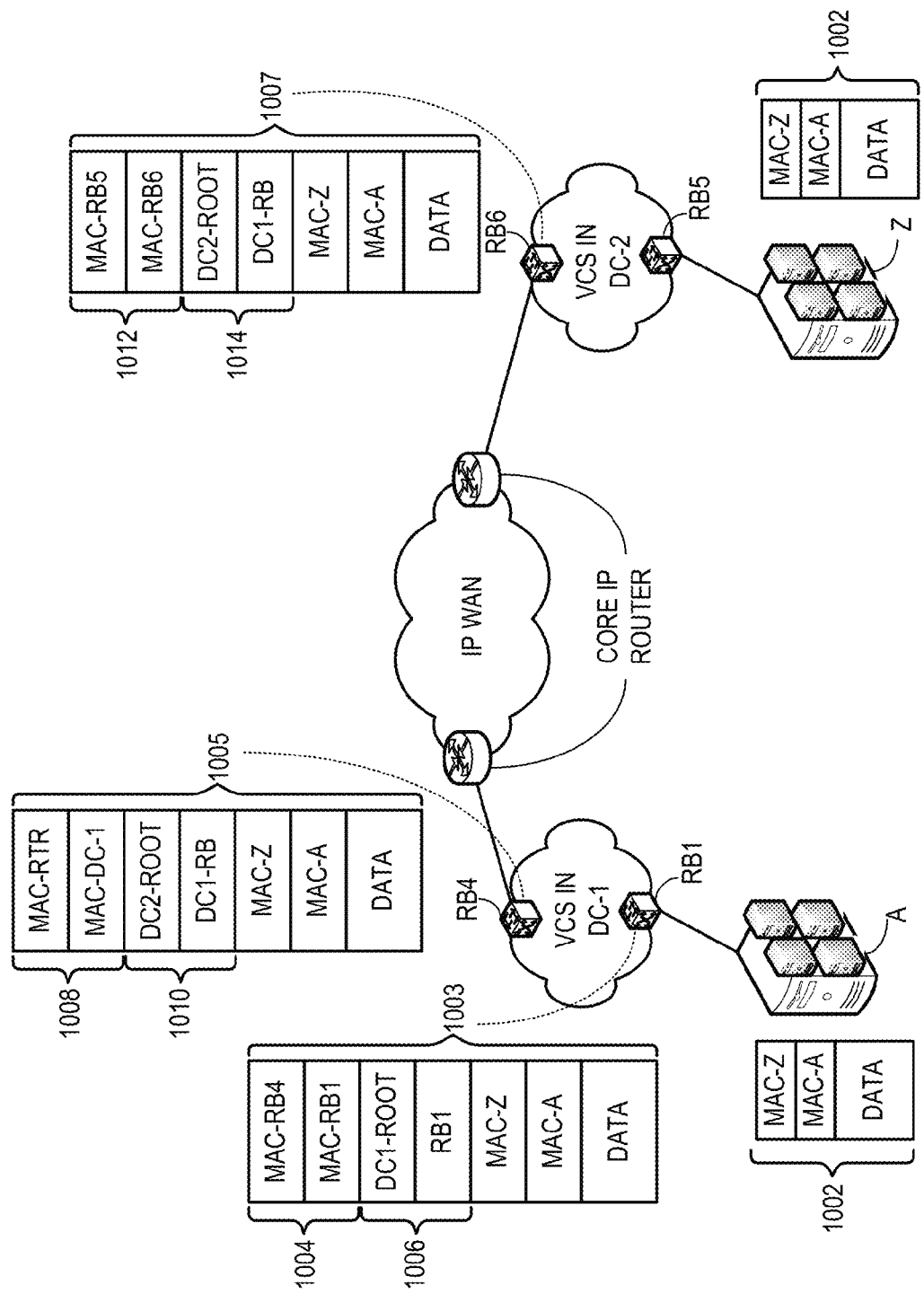
FIG. 4A presents a diagram illustrating how CNE devices handle broadcast, unknown unicast, and multicast (BUM) traffic across data centers, in accordance with one embodiment of the present invention.

FIG. 4A presents a diagram illustrating how CNE devices handle broadcast, unknown unicast, and multicast (BUM) traffic across data centers, in accordance with one embodiment of the present invention. In this example, two data centers, DC-1 and DC-2, are coupled to an IP WAN via core IP routers. The CNE device in DC-1 has an RBridge identifier of RB4, and the CNE device in DC-2 has an RBridge identifier of RB6. Furthermore, in the VCS in DC-1, a member switch RB1 is coupled to host A. In the VCS in DC-2, a member switch RB5 is coupled to host Z.

Assume that host A needs to send multicast traffic to host Z, and that host A already has the knowledge of host Z's MAC address. During operation, host A assembles an Ethernet frame 1002, which has host Z's MAC address (denoted as MAC-Z) as its destination address (DA), and host A's MAC address (denoted as MAC-A) as its source address (SA). Based on frame 1002, member switch RB1 assembles a TRILL frame 1003, whose TRILL header 1006 includes the RBridge identifier of data center DC-1's root RBridge (denoted as "DC1-ROOT") as the destination RBridge, and RB1 as the source RBridge. (That is, within DC-1, the multicast traffic is distributed on the local multicast tree.) The outer Ethernet header 1004 of frame 1003 has CNE device RB4's MAC address (denoted as MAC-RB4) as the DA, and member switch RB1's MAC address (denoted as MAC-RB1) as the SA.

When frame 1003 reaches CNE device RB4, it further modifies the frame's TRILL header to produce frame 1005. CNE device RB4 replaces the destination RBridge identifier in the TRILL header 1010 with data center DC-2's root RBridge identifier DC2-ROOT. The source RBridge identifier is changed to data center DC-1's virtual RBridge identifier, DC1-RB (which allows data center DC-2 to learn data center DC-1's RBridge identifier). Outer Ethernet header 1008 has the core router's MAC address (MAC-RTR) as its DA, and CNE device RB4's MAC address (MAC-DC-1) as its SA.

Frame 1005 is subsequently transported across the IP WAN in an FCIP tunnel and reaches CNE device RB6. Correspondingly, CNE device RB6 updates the header to produce frame 1007. Frame 1007's TRILL header 1014 remains the same as frame 1005. The outer Ethernet header 1012 now has member switch RB5's MAC address, MAC-RB5, as its DA, and CNE device RB6's MAC address, MAC-RB6, as its SA. Once frame 1007 reaches member switch RB5, the TRILL header is removed, and the inner Ethernet frame is delivered to host Z.

In various embodiments, a CNE device can be configured to allow or disallow unknown unicast, broadcast (e.g., ARP), or multicast (e.g., IGMP snooped) traffic to cross data center boundaries. By having these options, one can limit the amount of BUM traffic across data centers. Note that all TRILL encapsulated BUM traffic between data centers can be sent with the remote data center's root RBridge identifier. This translation is done at the terminating point of the FCIP tunnel.

Additional mechanisms can be implemented to minimize BUM traffic across data centers. For instance, the TRILL ports between the CNE device and any VCS member switch can be configured to not participate in any of the VLAN MGIDs. In addition, the eNS on both VCSs can be configured to synchronize their learned MAC address database to minimize traffic with unknown MAC DA. (Note that in one embodiment, before the learned MAC address databases are synchronized in different VCSs, frames with unknown MAC DAs are flooded within the local data center only.)

To further minimize BUM traffic, broadcast traffic such as ARP traffic can be reduced by snooping ARP responses to build ARP databases on VCS member switches. The learned ARP databases are then exchanged and synchronized across different data centers using eNS. Proxy-based ARP is used to respond to all know ARP requests in a VCS. Furthermore, multicast traffic across data centers can be reduced by distributing the multicast group membership across data canters by sharing the IGMP snooping information via eNS.

The process of forwarding unicast traffic between data centers is described as follows. During the FCIP tunnel formation, the logical RBridge identifiers representing data centers are exchanged. When a TRILL frame arrives at the entry node of the FCIP tunnel, wherein the TRILL destination RBridge is set as the RBridge identifier of the remote data center, the source RBridge in the TRILL header is translated to the logical RBridge identifier assigned to the local data center. When the frame exits the FCIP tunnel, the destination RBridge field in the TRILL header is set as the local (i.e., the destination) data center's virtual RBridge identifier. The MAC DA and VLAN ID in the inner Ethernet header is then used to look up the corresponding destination RBridge (i.e., the RBridge identifier of the member switch to which the destination host is attached, and the destination RBridge field in the TRILL header is updated accordingly.

In the destination data center, based on an ingress frame, all the VCS member switches learn the mapping between the MAC SA (in the inner Ethernet header of the frame) and the TRILL source RBridge (which is the virtual RBridge identifier assigned to the source data center). This allows future egress frames destined to that MAC address to be sent to the right remote data center. Note that since the RBridge identifier assigned to a given data center does not correspond to a physical RBridge, in one embodiment, a static route is used to map a remote data-center RBridge identifier to the local CNE device.

Figure 4B:
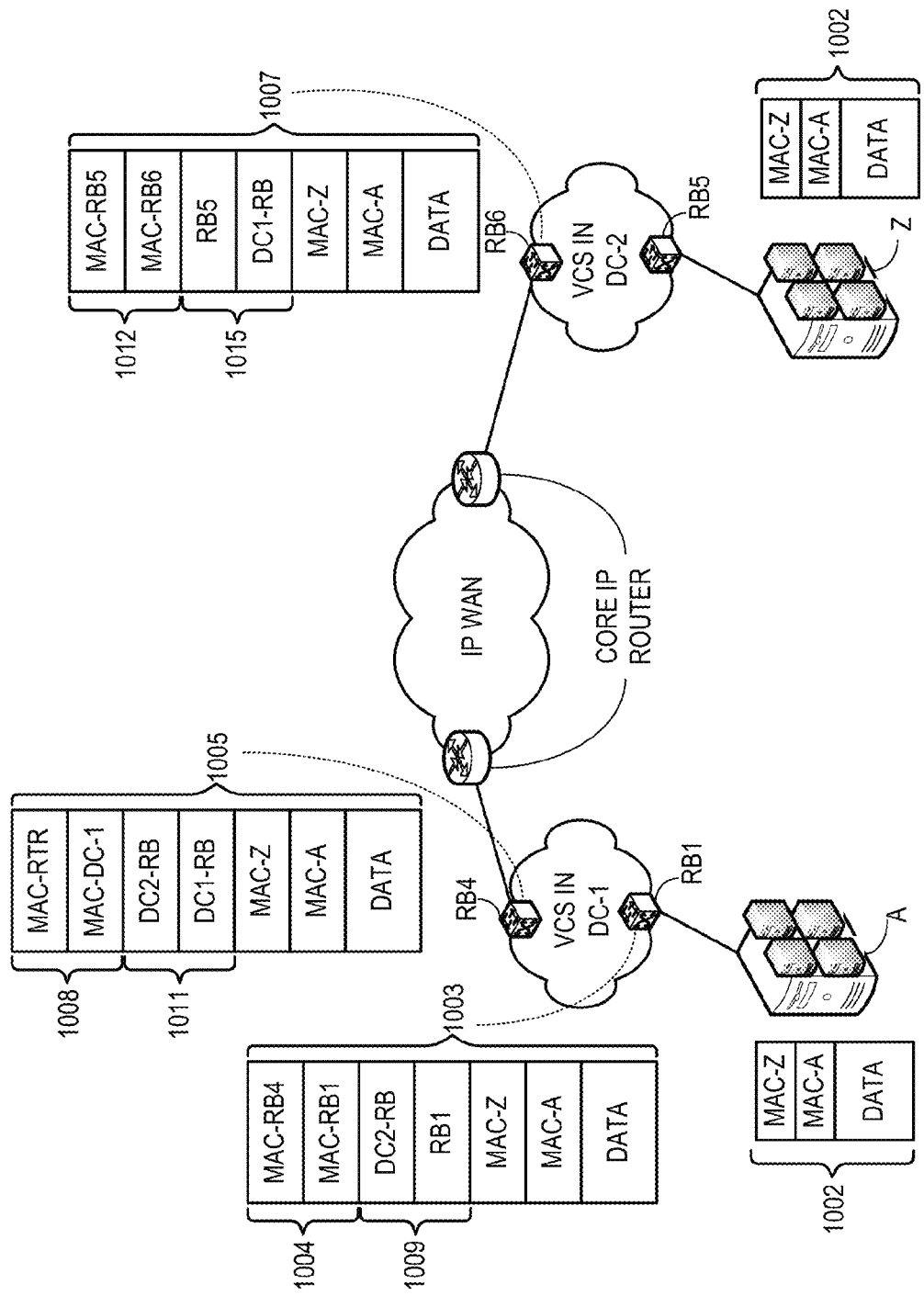
FIG. 4B presents a diagram illustrating how CNE devices handle unicast traffic across data centers, in accordance with one embodiment of the present invention.

FIG. 4B presents a diagram illustrating how CNE devices handle unicast traffic across data centers, in accordance with one embodiment of the present invention. Assume that host A needs to send unicast traffic to host Z, and that host A already has the knowledge of host Z's MAC address. During operation, host A assembles an Ethernet frame 1002, which has host Z's MAC address (MAC-Z) as its DA, and host A's MAC address (MAC-A) as its SA. Based on frame 1002, member switch RB1 assembles a TRILL frame 1003, whose TRILL header 1009 includes the RBridge identifier of data center DC-2's virtual Rbridge (denoted as "DC2-RB") as the destination RBridge, and RB1 as the source RBridge. The outer Ethernet header 1004 of frame 1003 has CNE device RB4's MAC address (MAC-RB4) as the DA, and member switch RB1's MAC address (MAC-RB1) as the SA.

When frame 1003 reaches CNE device RB4, it further modifies the frame's TRILL header to produce frame 1005. CNE device RB4 replaces the source RBridge identifier in the TRILL header 1011 with data center DC-1's virtual RBridge identifier DC1-RB (which allows data center DC-2 to learn data center DC-1's RBridge identifier). Outer Ethernet header 1008 has the core router's MAC address (MAC-RTR) as its DA, and CNE device RB4's MAC address (MAC-DC-1) as its SA.

Frame 1005 is subsequently transported across the IP WAN in an FCIP tunnel and reaches CNE device RB6. Correspondingly, CNE device RB6 updates the header to produce frame 1007. Frame 1007's TRILL header 1015 has an updated destination RBridge identifier, which is RB5, the VCS member switch in DC-2 that couples to host Z. The outer Ethernet header 1012 now has member switch RB5's MAC address, MAC-RB5, as its DA, and CNE device RB6's MAC address, MAC-RB6, as its SA. Once frame 1007 reaches member switch RB5, the TRILL header is removed, and the inner Ethernet frame is delivered to host Z.

Flooding across data centers of frames with unknown MAC DAs is one way for the data centers to learn the MAC address in another data center. All unknown SAs are learned as MACs behind an RBridge and it is no exception for the CNE device. In one embodiment, eNS can be used to distribute learned MAC address database, which reduces the amount of flooding across data centers.

In order to optimize flushes, even though MAC addresses are learned behind RBridges, the actual VCS edge port associated with a MAC address is present in the eNS MAC updates. However, the edge port IDs might no longer be unique across data-centers. To resolve this problem, all eNS updates across data centers will qualify the MAC entry with the data-center's RBridge identifier. This configuration allows propagation of port flushes across data centers.

In the architecture described herein, VCSs in different data-centers do not join each other; hence the distributed configurations are kept separate. However, in order to allow virtual machines to move across data-centers, there will be some configuration data that needs to be synchronized across data-centers. In one embodiment, a special module (in either software or hardware) is created for CNE purposes. This module is configured to retrieve the configuration information needed to facilitate moving of virtual machines across data centers and it is synchronized between two or more VCSs.

In one embodiment, the learned MAC address databases are distributed across data centers. Also, edge port state change notifications (SCNs) are also distributed across data centers. When a physical RBridge is going down, the SCN is converted to multiple port SCNs on the inter-data-center FCIP link.

In order to protect the inter-data-center connectivity, a VCS can form a vLAG between two or more CNE devices. In this model, the vLAG RBridge identifier is used as the data-center RBridge identifier. The FCIP control plane is configured to be aware of this arrangement and exchange the vLAG RBridge identifers in such cases.

Figure 5:
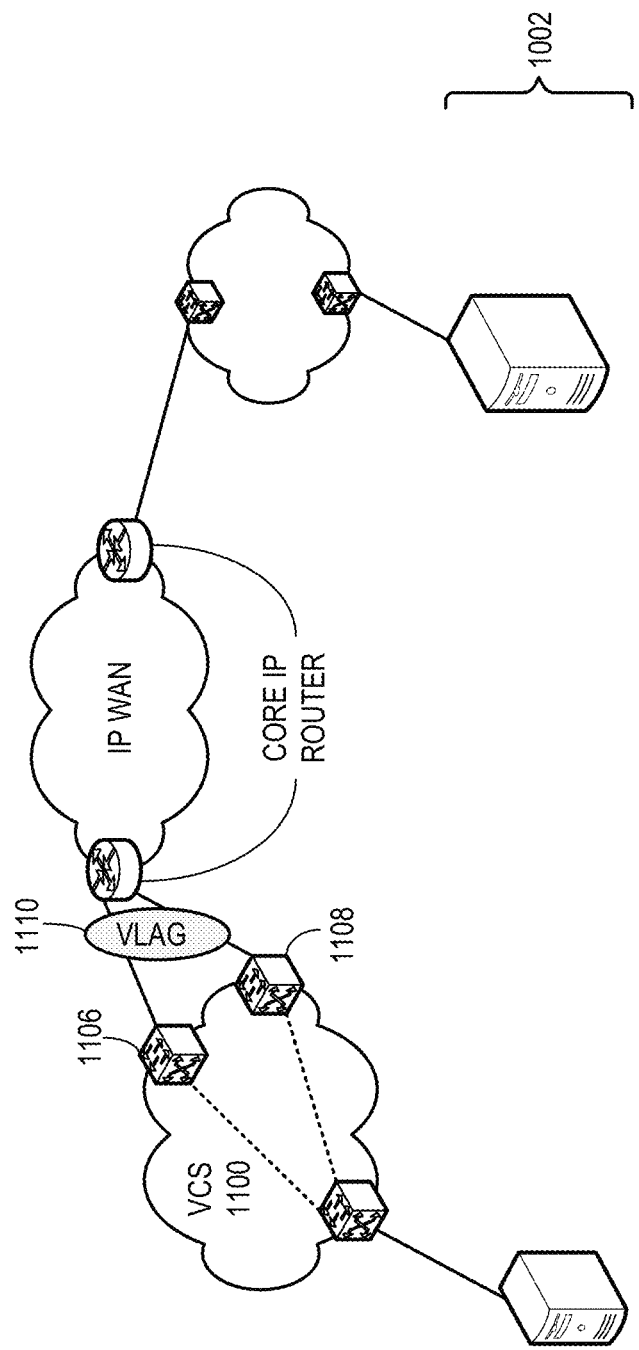
FIG. 5 illustrates an example where two CNE devices are used to construct a vLAG, in accordance with an embodiment of the present invention.

FIG. 5 illustrates an example where two CNE devices are used to construct a vLAG, in accordance with an embodiment of the present invention. In this example, a VCS 1100 includes two CNE devices 1106 and 1108. Both CNE devices 1106 and 1108 forms a vLAG 1110 which is coupled to a core IP router. vLAG 1110 is assigned a virtual RBridge identifier, which is also used as the data-center RBridge identifier for VCS 1100. Furthermore, vLAG 1110 can facilitate both ingress and egress load balancing (e.g., based on equal-cost multi-pathing (ECMP)) for any member switch within VCS 1100.

Figure 6:
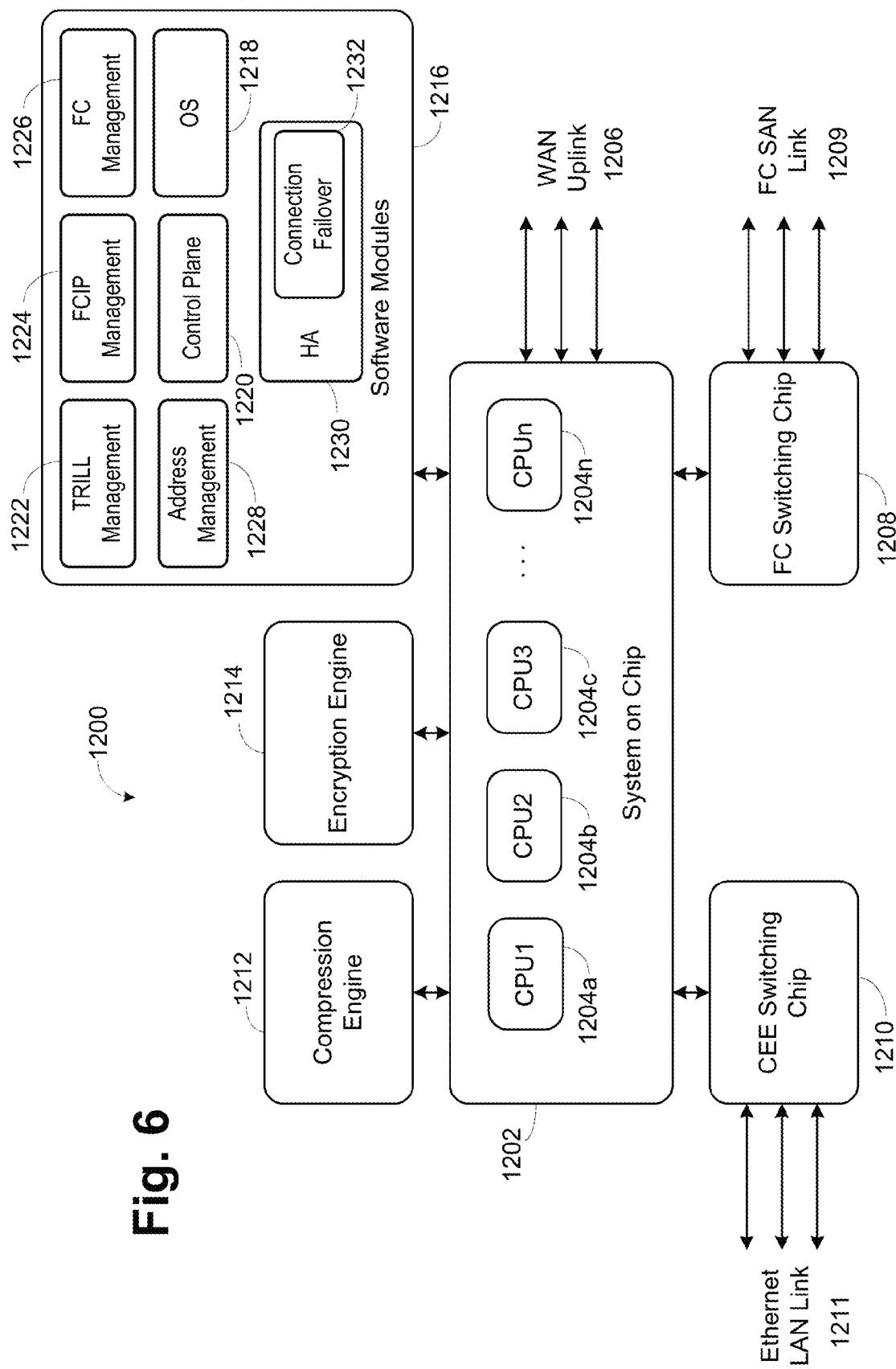
FIG. 6 is a block diagram of an embodiment of an LDCM appliance according to the present invention.

FIG. 6 illustrates a CNE/LDCM device 1200, the LDCM features preferably being added to a CNE device to create a single device. A system on chip (SOC) 1202 provides the primary processing capabilities, having a plurality of CPUs 1204. A number of Ethernet connections 1206 are preferably included on the SOC 1202 to act as the WAN link, though a separate Ethernet device could be used if desired. An FC switching chip 1208 is connected to the SOC 1202 to provide connections to FC SANs. A CEE switching chip 1210 is connected to the SOC 1202 to allow attachment to the VCS or to an Ethernet LAN. A compression engine 1212 is provided with the SOC 1202 to provide compression and dedup capabilities to reduce traffic over the WAN links. An encryption engine 1214 is provided for security purposes, as preferably the FCIP tunnel is encrypted for security.

Various software modules 1216 are present in a memory in the CNE/LDCM device 1200. These include an underlying operating system 1218, a control plane module 1220 to manage interaction with the VCS, a TRILL management module 1222 for TRILL functions above the control plane, an FCIP management module 1224 to manage the FCIP tunnels over the WAN, an FC management module 1226 to interact with the FC SAN and an address management module 1228. An additional module is a high availability (HA) module 1230, which in turn includes a connection failover submodule 1232. The software in the connection failover submodule 1232 is executed in the CPUs 1204 to perform the connection failover operations described below relating to FIGS. 12-16.

Figure 7:
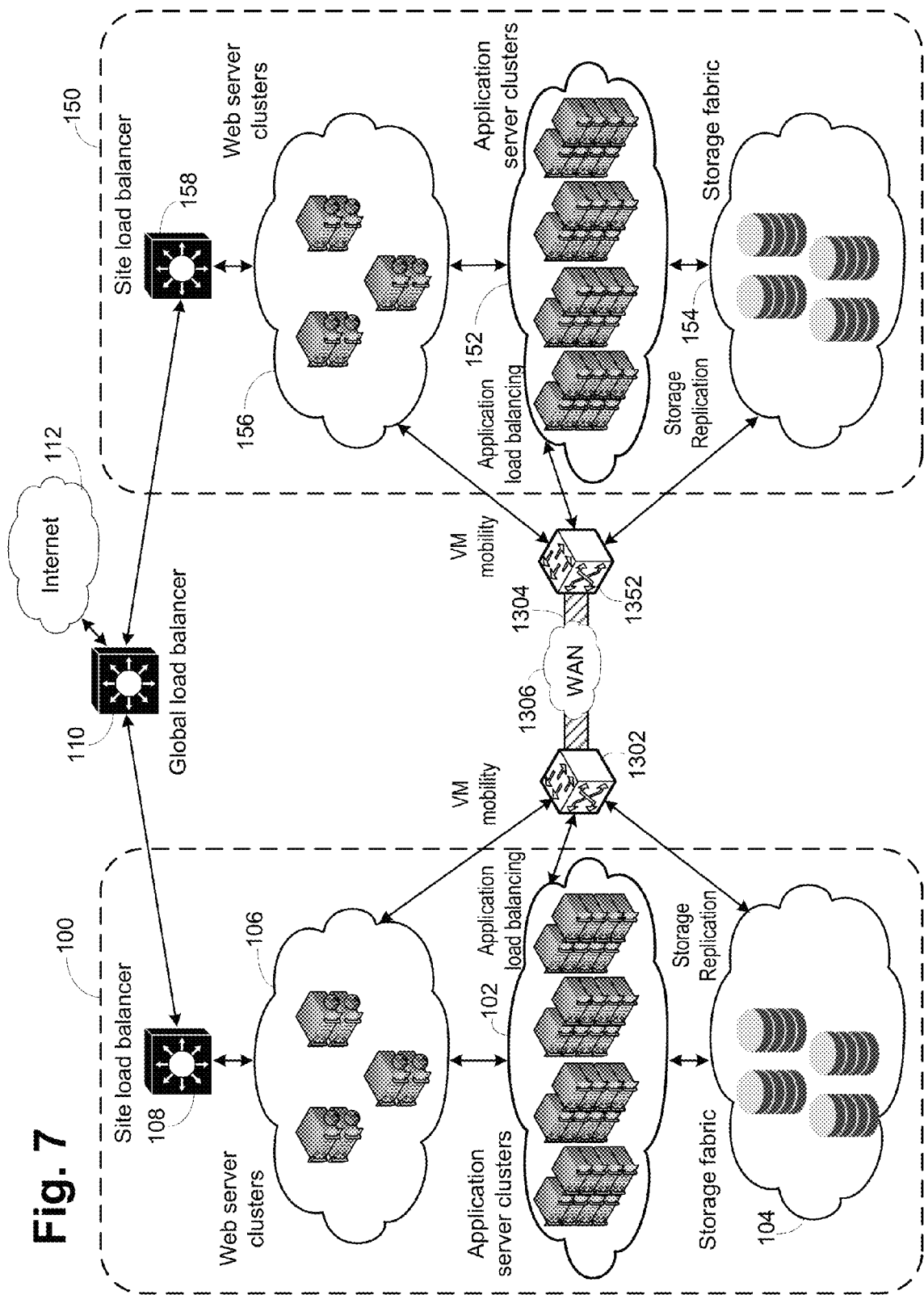
FIG. 7 is a block diagram of the data centers of FIG. 1 modified to operate according to aspects of the present invention.

FIG. 7 illustrates data centers with the addition of CNE/LDCM devices 1302, 1352. Two data centers 100, 150 are illustrated. Each has a series of application server clusters 102, 152 which execute the actual applications, such as in a SaaS (software as a Service) architecture. Data is stored in a storage fabric 104, 154. Access to the application server clusters 102, 152 is shown as being through web server clusters 106, 156, though more direct access at the LAN layer is common. A site load balancer 108, 158 distributes incoming requests across the web servers in the web server clusters 106, 156. A global load balancer no is connected to the Internet 112 to balance load between the data centers 100, 150. The CNE/LDCM devices 1302 and 1352 create a cloud virtual interconnect (CVI) 1304 between themselves, effectively an FCIP tunnel through the WAN 1306. The CVI 1304 is used for VM mobility, application load balancing and storage replication between the data centers 100, 150.

The cloud virtual interconnect 1304 preferably includes the following components. An FCIP trunk, as more fully described in U.S. patent application Ser. No. 12/880,495, entitled "FCIP Communications with Load Sharing and Failover", filed Sep. 13, 2010, which is hereby incorporated by reference, aggregates multiple TCP connections to support wide WAN bandwidth ranges from 100 Mbps up to 20 Gbps. It also supports multi-homing and enables transparent failover between redundant network paths.

Adaptive rate limiting (ARL) is performed on the TCP connections to change the rate at which data is transmitted through the TCP connections. ARL uses the information from the TCP connections to determine and adjust the rate limit for the TCP connections dynamically. This will allow the TCP connections to utilize the maximum available bandwidth. It also provides a flexible number of priorities for defining policies and the users are provisioned to define the priorities needed.

High bandwidth TCP (HBTCP) is designed to be used for high throughput applications, such as virtual machine and storage migration, over long fat networks. It overcomes the challenge of the negative effect of traditional TCP/IP in WAN. In order to optimize the performance the following changes have been made.

1) Scaled Windows: In HBTCP, scaled windows are used to support WAN latencies of up to 350 ms or more. Maximum consumable memory will be allocated per session to maintain the line rate.

2) Optimized reorder resistance: HBTCP has more resistance to duplicate acknowledgements and requires more duplicate ACK's to trigger the fast retransmit.

3) Optimized fast recovery: In HBTCP, instead of reducing the cwnd by half, it is reduced by substantially less than 50% in order to make provision for the cases where extensive network reordering is done.

4) Quick Start: The slow start phase is modified to quick start where the initial throughput is set to a substantial value and throughput is only minimally reduced when compared to the throughput before the congestion event.

5) Congestion Avoidance: By carefully matching the amount of data sent to the network speed, congestion is avoided instead of pumping more traffic and causing a congestion event so that congestion avoidance can be disabled.

6) Optimized slow recovery: The retransmission timer in HBTCP (150 ms) expires much quicker than in traditional TCP and is used when fast retransmit cannot provide recovery. This triggers the slow start phase earlier when a congestion event occurs.

7) Lost packet continuous retry: Instead of waiting on an ACK for a SACK retransmitted packet, continuously retransmit the packet to improve the slow recovery, as described in more detail in U.S. patent application Ser. No. 12/972,713, entitled "Repeated Lost Packet Retransmission in a TCP/IP Network", filed Dec. 20, 2010, which is hereby incorporated by reference.

The vMotion migration data used in VM mobility for VMware systems enters the CNE/LDCM device 1302 through the LAN Ethernet links of the CEE switching chip 1210 and the compressed, encrypted data is sent over the WAN infrastructure using the WAN uplink using the Ethernet ports 1206 of the SOC 1202. Similarly for storage migration, the data from the SAN FC link provided by the FC switching chip 1208 is migrated using the WAN uplink to migrate storage. The control plane module 1220 takes care of establishing, maintaining and terminating TCP sessions with the application servers and the destination LDCM servers.

Figure 8B:
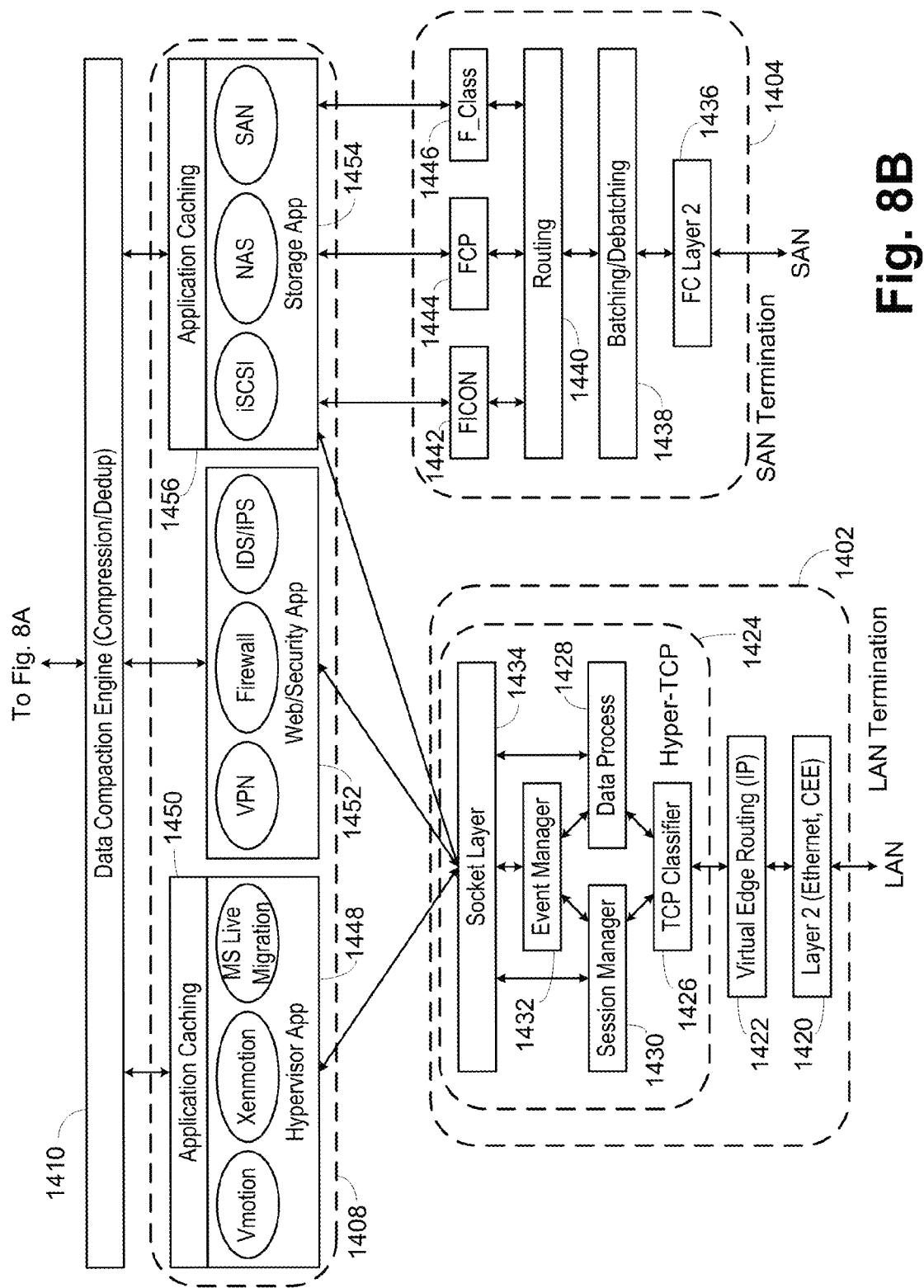

FIGS. 8A and 8B illustrate the functional blocks and modules of the CNE/LDCM device. LAN termination 1402 and SAN termination 1404 are interconnected to the CVI 1406 by an application module 1408, the data compaction engine 1410 and a high reliability delivery application (HRDA) layer 1412.

LAN termination 1402 has a layer 2, Ethernet or CEE, module 1420 connected to the LAN ports. An IP virtual edge routing module 1422 connects the layer 2 module 1420 to a Hyper-TCP module 1424. The Hyper-TCP module 1424 operation is described in more detail below and includes a TCP classifier 1426 connected to the virtual edge routing module 1422. The TCP classifier 1426 is connected to a data process module 1428 and a session manager 1430. An event manager 1432 is connected to the data process module 1428 and the session manager 1430. The event manager 1432, the data process module 1428 and the session manager 1430 are all connected to a socket layer 1434, which acts as the interface for the Hyper-TCP module 1424 and the LAN termination 1402 to the application module 1408.

SAN termination 1404 has an FC layer 2 module 1436 connected to the SAN ports. A batching/debatching module 1438 connects the FC layer 2 module 1436 to a routing module 1440. Separate modules are provided for FICON traffic 1442, FCP traffic 1444 and F_Class traffic 1446, with each module connected to the routing module 1440 and acting as interfaces between the SAN termination 1404 and the application module 1408.

The application module 1408 has three primary applications, hypervisor 1448, web/security 1452 and storage 1454. The hypervisor application 1448 cooperates with the various hypervisor motion functions, such vMotion, Xenmotion and MS Live Migration. A caching subsystem 1450 is provided with the hypervisor application 1448 for caching of data during the motion operations. The web/security application 1452 cooperates with VPNs, firewalls and intrusion systems. The storage application 1454 handles iSCSI, NAS and SAN traffic and has an accompanying cache 1456.

The data compaction engine 1410 uses the compression engine 1212 to handle compression/decompression and dedup operations to allow improved efficiency of the WAN links.

The main function of the HRDA layer 1412 is to ensure the communication reliability at the network level and also at the transport level. As shown, the data centers are consolidated by extending the L2 TRILL network over IP through the WAN infrastructure. The redundant links are provisioned to act as back up paths. The HRDA layer 1412 performs a seamless switchover to the backup path in case the primary path fails. HBTCP sessions running over the primary path are prevented from experiencing any congestion event by retransmitting any unacknowledged segments over the backup path. The acknowledgements for the unacknowledged segments and the unacknowledged segments themselves are assumed to be lost. The HRDA layer 1412 also ensures reliability for TCP sessions within a single path. In case a HBTCP session fails, any migration application using the HBTCP session will also fail. In order to prevent the applications from failing, the HRDA layer 1412 transparently switches to a backup HBTCP session.

The CVI 1406 includes an IP module 1466 connected to the WAN links. An IPSEC module 1464 is provided for link security. A HBTCP module 1462 is provided to allow the HBTCP operations as described above. A QoS/ARL module 1460 handles the QoS and ARL functions described above. A trunk module 1458 handles the trunking described above.

Hyper-TCP is a component in accelerating the migration of live services and applications over long distance networks. Simply, a TCP session between the application client and server is locally terminated and by leveraging the high bandwidth transmission techniques between the data centers, application migration is accelerated.

Hyper-TCP primarily supports two modes of operation:

1) Data Termination Mode (DTM): In data termination mode, the end device TCP sessions are not altered but the data is locally acknowledged and data sequence integrity is maintained.

2) Complete Termination Mode (CTM): In the complete termination mode, end device TCP sessions are completely terminated by the LDCM. Data sequence is not maintained between end devices but data integrity is guaranteed.

There are primarily three phases in Hyper-TCP. They are Session Establishment, Data Transfer and Session Termination. These three phases are explained below.

1) Session Establishment: During this phase, the connection establishment packets are snooped and the TCP session data, like connection end points, Window size, MTU and sequence numbers, are cached. The Layer 2 information like the MAC addresses is also cached. The TCP session state on the Hyper-TCP server is same as that of the application server and the TCP session state of the Hyper-TCP client is same as application client. With the cached TCP state information, the Hyper-TCP devices can locally terminate the TCP connection between the application client and server and locally acknowledge the receipt of data packets. Hence, the RTT's calculated by the application will be masked from including the WAN latency, which results in better performance.

Figure 9:
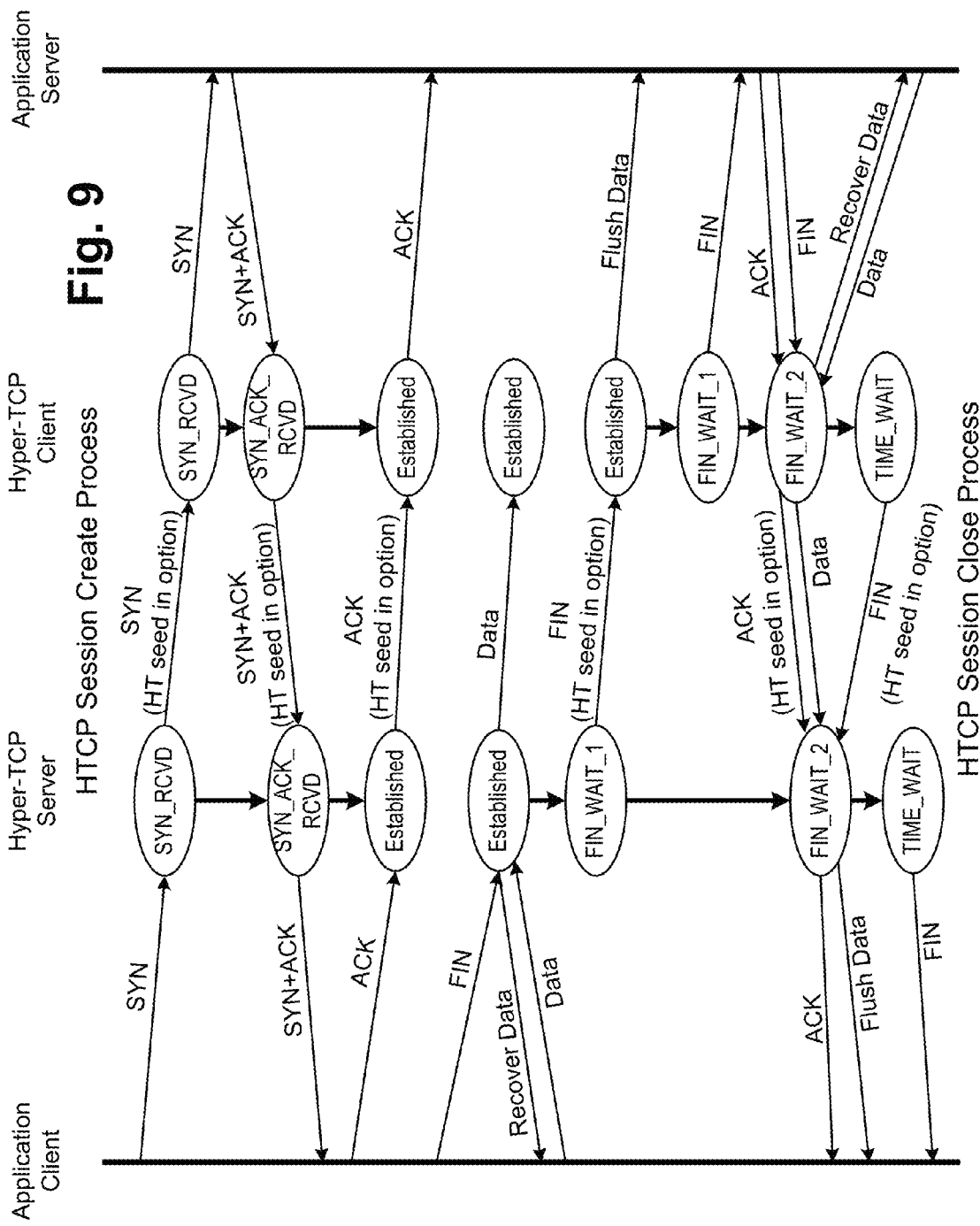
FIG. 9 is a ladder diagram of Hyper-TCP session create and close processes according to the present invention.

The session create process is illustrated in FIG. 9. The application client transmits a SYN, which is snooped by the Hyper-TCP server. The Hyper-TCP server forwards the SYN to the Hyper-TCP client, potentially with a seed value in the TCP header options field. The seed value can indicate whether this is a Hyper-TCP session, a termination mode, the Hyper-TCP version and the like. The seed value is used by the various modules, such as the data compaction engine 1410 and the CVI 1406, to determine the need for and level of acceleration of the session. The Hyper-TCP client snoops and forwards the SYN to the application server. The application server responds with a SYN+ACK, which the Hyper-TCP client snoops and forwards to the Hyper-TCP server. The Hyper-TCP server snoops the SYN+ACK and forwards it to the application client. The application client responds with an ACK, which the Hyper-TCP server forwards to the Hyper-TCP client, which in turn provides it to the application server. This results in a created TCP session.

2) Data Transfer Process: Once the session has been established, the data transfer is always locally handled between a Hyper-TCP device and the end device. A Hyper-TCP server acting as a proxy destination server for the application client locally acknowledges the data packets and the TCP session state is updated. The data is handed over to the HBTCP session between the Hyper-TCP client and server. HBTCP session compresses and forwards the data to the Hyper-TCP client. This reduces the RTT's seen by the application client and the source as it masks the latencies incurred on the network. The data received at the Hyper-TCP client is treated as if the data has been generated by the Hyper-TCP client and the data is handed to the Hyper-TCP process running between the Hyper-TCP client and the application server. Upon congestion in the network, the amount of data fetched from the Hyper-TCP sockets is controlled.

Figure 10:
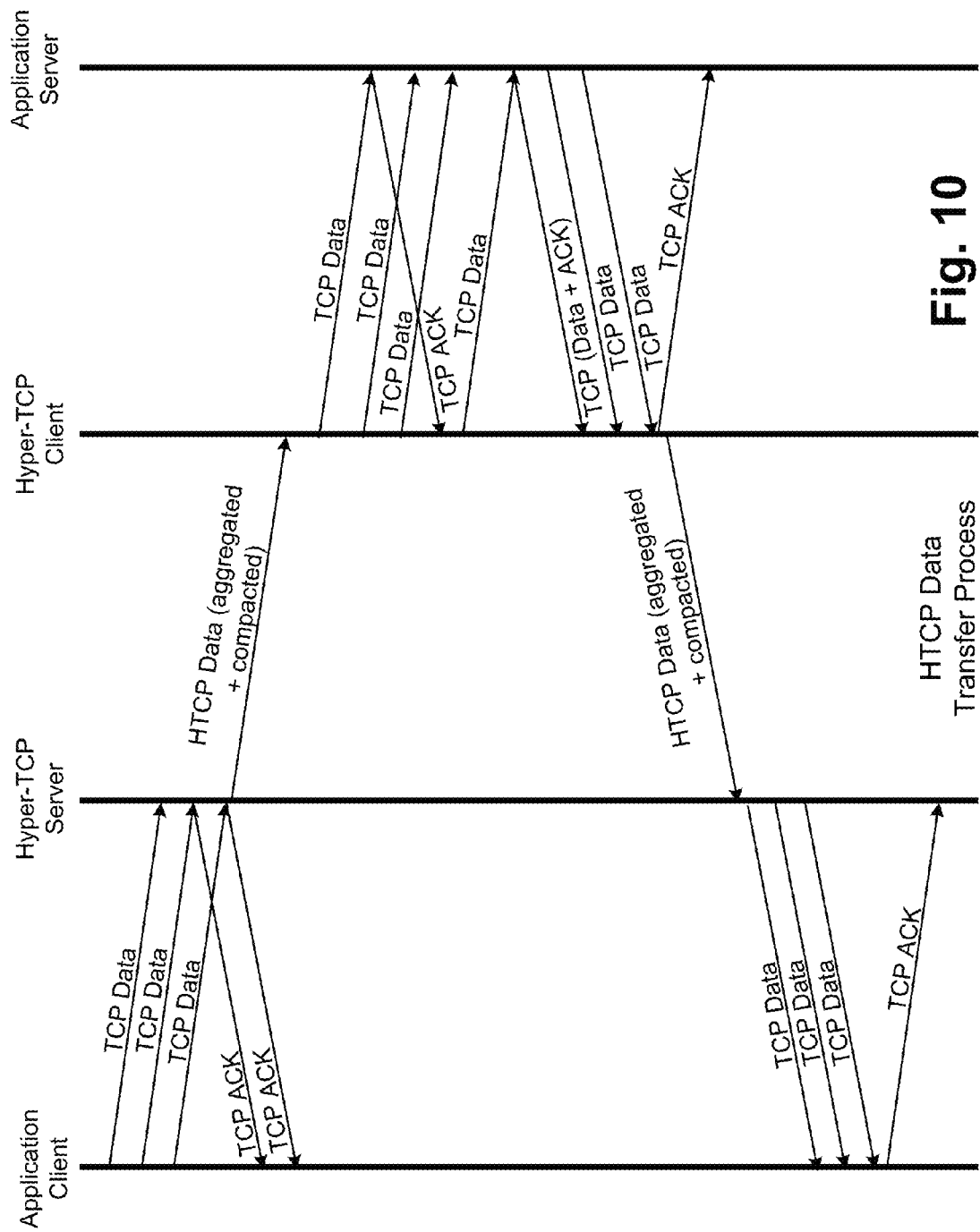
FIG. 10 is a ladder diagram of Hyper-TCP data transfer operations according to the present invention.

This process is illustrated in FIG. 10. Data is provided from the application client to the Hyper-TCP server, with the Hyper-TCP server ACKing the data as desired, thus terminating the connection locally at the Hyper-TCP server. The LDCM device aggregates and compacts the received data to reduce WAN traffic and sends it to the Hyper-TCP client in the other LDCM device. The receiving LDCM device uncompacts and deaggregates the data and provides it to the Hyper-TCP client, which in turn provides it to the application server, which periodically ACKs the data. Should the application server need to send data to the application client, the process is essentially reversed. By having the Hyper-TCP server and client locally respond to the received data, thus locally terminating the connections, the application server and client are not aware of the delays resulting from the WAN link between the Hyper-TCP server and client.

3) Session Termination: A received FIN/RST is transparently sent across like the session establishment packets. This is done to ensure the data integrity and consistency between the two end devices. The FIN/RST received at the Hyper-TCP server will be transparently sent across only when all the packets received prior to receiving a FIN have been locally acknowledged and sent to the Hyper-TCP client. If a FIN/RST packet has been received on the Hyper-TCP client, the packet will be transparently forwarded after all the enqueued data has been sent and acknowledged by the application server. In either direction, once the FIN has been received and forwarded, the further transfer of packets is done transparently and is not locally terminated.

This is shown in more detail in FIG. 9. The application client provides a FIN to the Hyper-TCP server. If any data has not been received by the Hyper-TCP server, the Hyper-TCP server will recover the data from the application client and provide it to the Hyper-TCP client. The Hyper-TCP server then forwards the FIN to the Hyper-TCP client, which flushes any remaining data in the Hyper-TCP client and then forwards the FIN to the application server. The application server replies with an ACK for the flushed data and then a FIN. The Hyper-TCP client then receives any outstanding data from the application server and recovers data to the application server. The ACK and the data are forwarded to the Hyper-TCP server. After the data is transferred, the Hyper-TCP client forwards the FIN to the Hyper-TCP server. The Hyper-TCP server forwards the ACK when received and flushes any remaining data to the application client. After those are complete, the Hyper-TCP server forwards the FIN and the session is closed.

Figure 11:
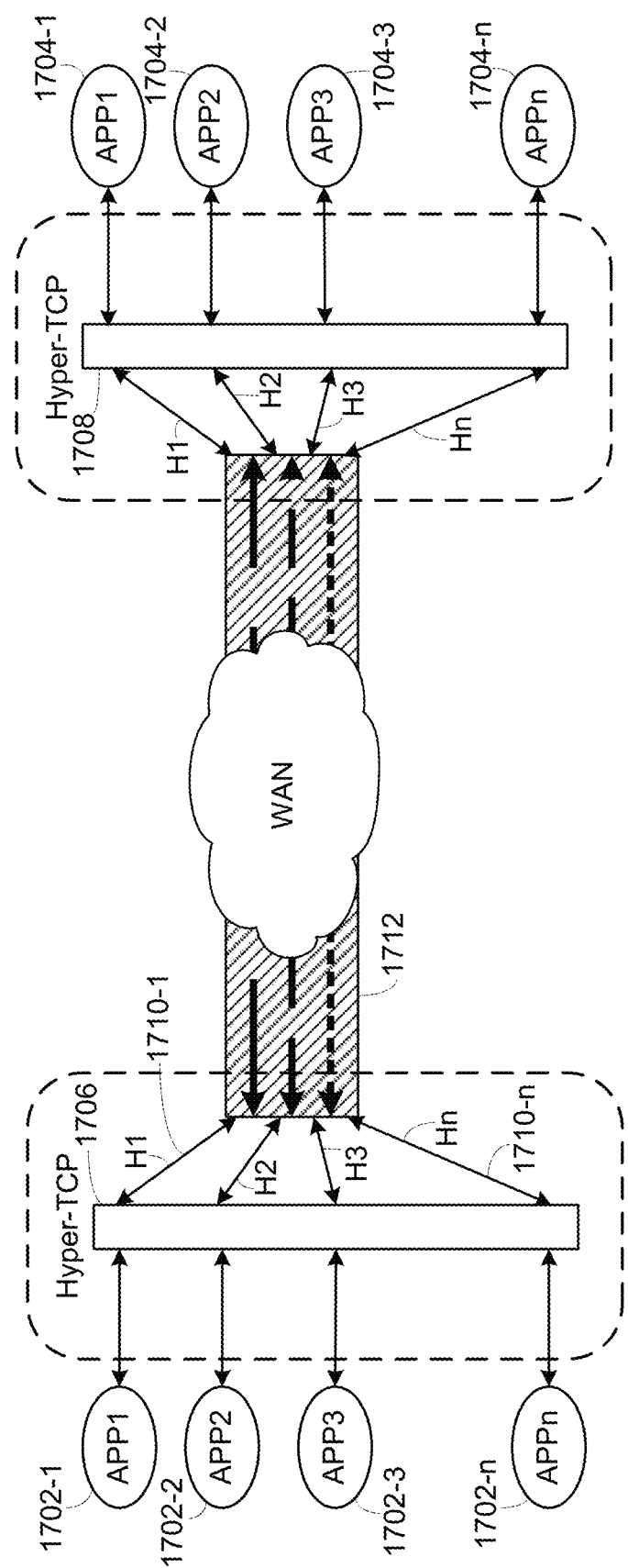
FIG. 11 is a block diagram illustrating the operation of Hyper-TCP according to the present invention.
Figure 12:
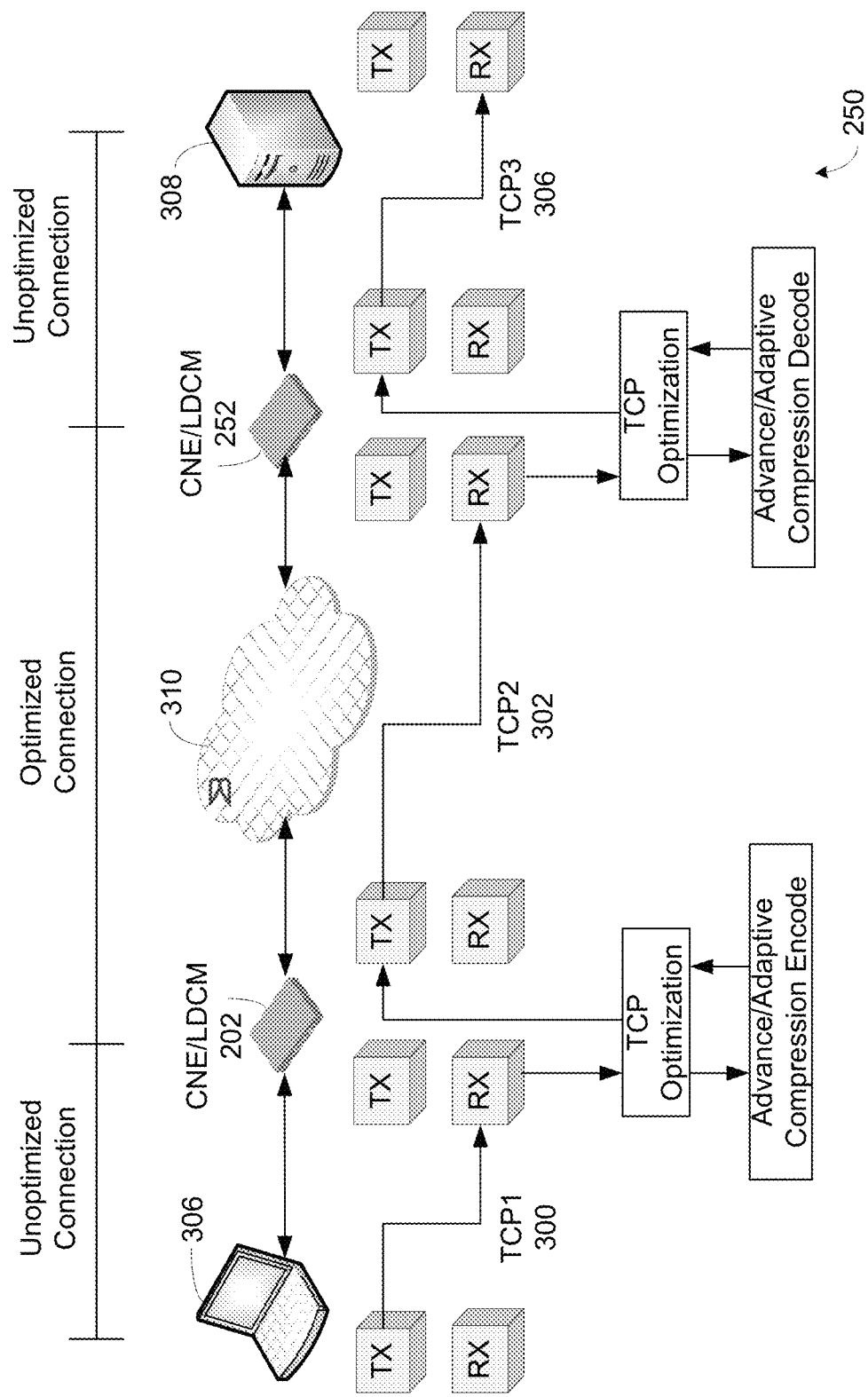
FIG. 12 is a block diagram of a WAN connection according to a first embodiment according to the present invention.

FIG. 11 illustrates the effective operation of the Hyper-TCP server and client over the CVI 1712. A series of applications 1702-1 to 1702-*n* are communicating with applications 1704-1 to 1704-*n*, respectively. The Hyper-TCP server agent 1706 cooperates with the applications 1702 while the Hyper-TCP agent 1708 cooperates with the applications 1704. In the illustration, four different Hyper-TCP sessions are shown, H1, H2, H3 and Hn 1710-1 to 1710-*n*, which traverse the WAN using the CVI 1712.

One of the main problems in WAN optimization is to provide lossless failover. Multiple TCP connections may be established to provide WAN optimization for a client-server pair. As show in FIG. 12, three TCP connections TCP1 300, TCP2 302, TCP3 304 are established to provide optimization for WAN traffic for a TCP connection between client 306 and server 308.

The WAN optimization device, such as CNE/LDCM 202, usually does a local TCP acknowledgement from the WAN optimization device 202 closest to the client 306. This WAN optimization device 202 buffers the data and delivers it to the remote WAN optimization device 252 that sends it to the server 308. A problem develops if the WAN optimization device 252 fails the data that has already been acknowledged using TCP acknowledge by the WAN optimization device 202. The data will be lost and cannot be recovered.

Figure 13:
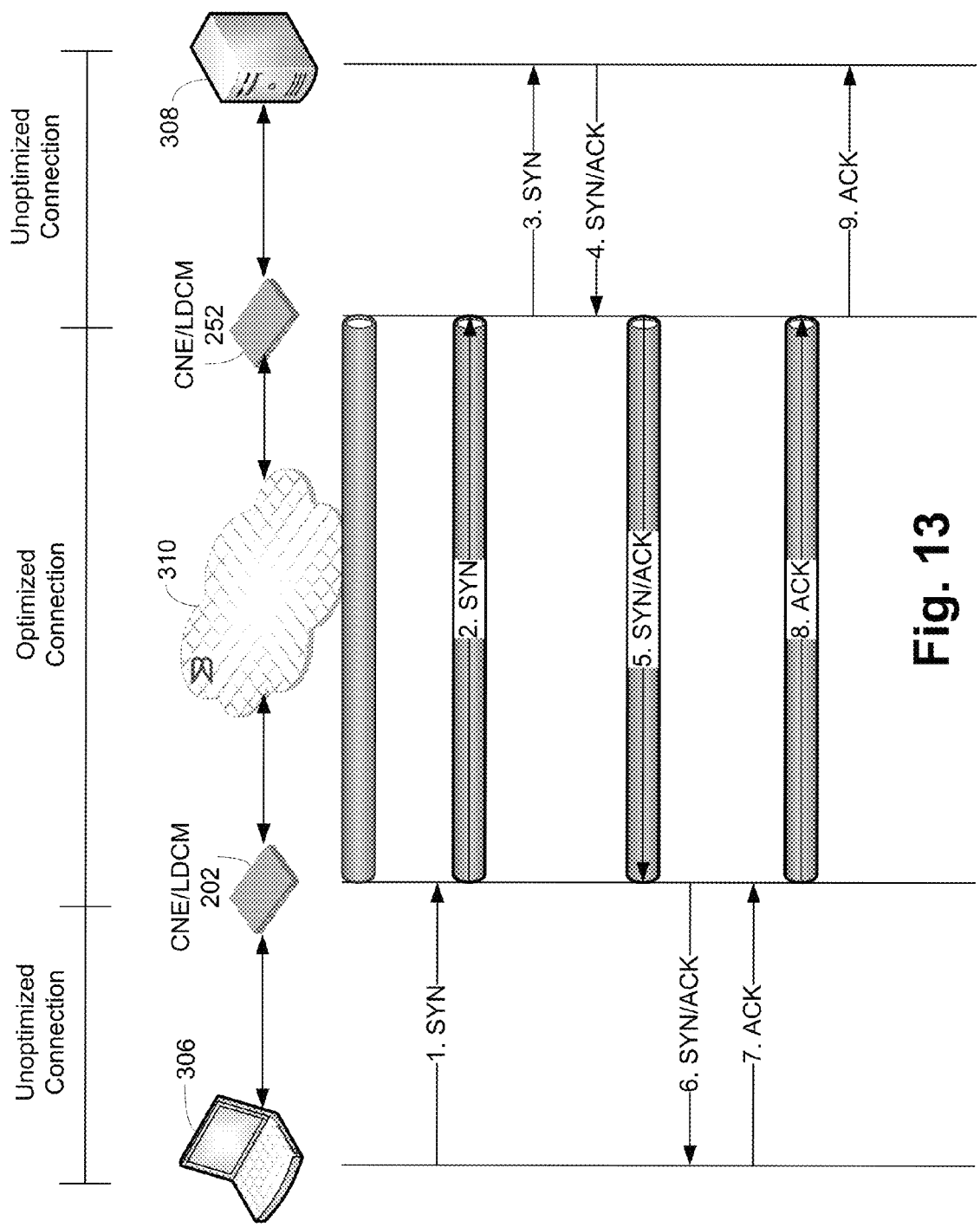
FIG. 13 is a ladder diagram illustrating WAN connection phases according to the first embodiment according to the present invention.

The problem can be divided into two phases: connection establishment phase and data phase. There is a LAN connection between client 306 and a CNE/LDCM device 202 on a LAN site 200 and a connection between a CNE/LDCM device 252 and a server 308 in another LAN site 250. In the connection establishment phase, the following sequence as shown in FIG. 13 guarantees the synchronization between CNE/LDCM devices 202, 252 in the connection establishment phase.

1. A client 306 sends a SYN request destined to remote server 308.

2. CNE/LDCM device 202 in the local side intercepts the SYN request and tunnels the request to remote CNE/LDCM device 252.

3. Remote CNE/LDCM device 252 sends the SYN request to the remote server 308 using the same source and destination IP addresses, TCP ports and sequence number as it receives from the client 306.

4. The server 308 sends SYN/ACK which will be intercepted by remote CNE/LDCM device 252.

5. Remote CNE/LDCM device 252 tunnels the SYN/ACK to local CNE/LDCM device 202.

6. Local CNE/LDCM device 202 sends SYN/ACK to the client 306 with the same source/destination IP addresses, TCP ports and sequence numbers.

7. The client 306 sends an ACK which is intercepted by CNE/LDCM device 202 in the local side 200.

8. Local CNE/LDCM device 202 tunnels the ACK to remote CNE/LDCM device 252 using the tunnel that is already created.

9. Remote CNE/LDCM device 252 forwards the ACK to the server 308 using the same source/destination IP addresses, TCP ports and sequence number as it receives.

In some variations step 9 can be done after step 4. In this case the CNE/LDCM device 252 closer to the server 308 may need to buffer any data packets received after sending the ACK until it receives ACK from the remote CNE/LDCM device 202. The CNE/LDCM device 252 on the server side may close its TCP window after receiving certain amount of packets. This can limit the number of packets that the CNE/LDCM device needs to buffer until it receives ACK from the CNE/LDCM device 202.

Figure 14:
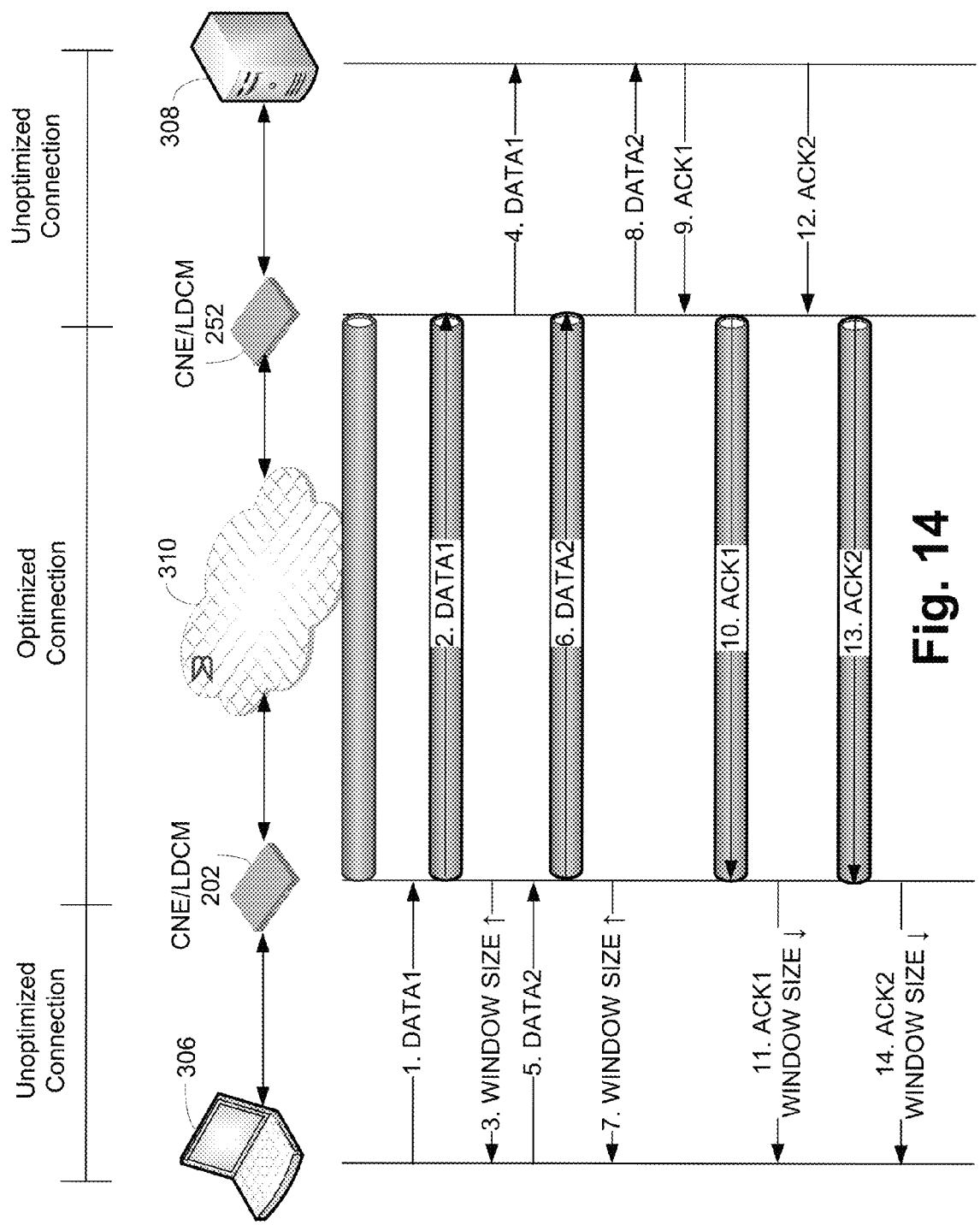
FIG. 14 is a ladder diagram illustrating WAN data phases according to the first embodiment according to the present invention.

To be able to provide lossless failover, the acknowledgments from the WAN optimization device 202 closer to the client 306 should be synchronized with the acknowledgments from the server 308. That is, the CNE/LDCM device 202 does not provide an ACK to the client 306 until it receives the forwarded ACK from the server 308. This synchronization can bring down the throughput of the WAN 310 because of the WAN latency. The WAN latency can cause the TCP window to be closed until the acknowledgment is received from the remote side CNE/LDCM device 252. In order to improve the LAN latency according to the present invention the TCP window in the local side CNE/LDCM 202 is opened after receiving the data correctly without sending acknowledge for that data. By doing that there is LAN like performance over the WAN 310 because the TCP window of the TCP1 300 connection between the client 306 and the CNE/LDCM device 202 is opened after receiving that data at the WAN optimization device 202. At the same time, the WAN optimization device 202 never acknowledges the data that is not delivered to the server 308 or other endpoint until it actually receives the forwarded ACK from the server 308. This is illustrated in FIG. 14 for two data transfers.

In one variation according to the present invention, the WAN TCP window for the TCP2 302 connection can be set to a large size to accommodate for the WAN latency from the beginning, instead of opening the TCP window every time in-order data is received.

This combination of synchronizing acknowledgements and opening the TCP window allows lossless operation and yet also better use of the WAN connection.

This can be paraphrased as: Do not do early ACK, which can cause data loss. Instead, delay ACK until actually received from target but open up the TCP window to allow improved flow without throttling issues. As an example, if the connection starts with 64K windows and 32K of data is received, the TCP window will be 32K. The CNE/LDCM device 202 will forward the data right away and will open the TCP window again to be 64K. When the ACK is received from the server 308 and forwarded to the client 306, the TCP window size will be reduced by specifying 64K, instead of the 96K it would be if the TCP window size was not changed.

Figure 15:
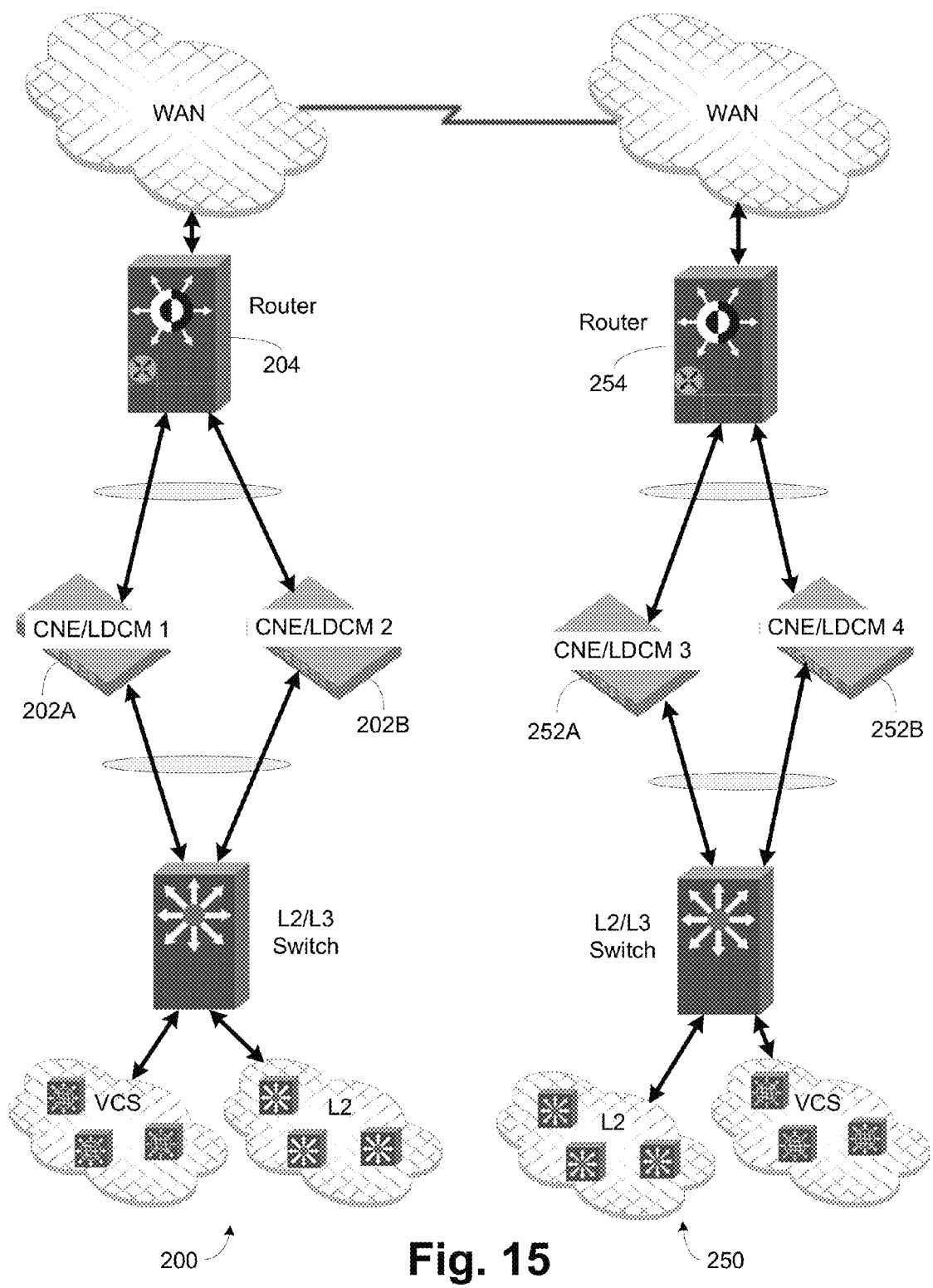
FIG. 15 is a block diagram of an HA configuration according to a second embodiment according to the present invention.

FIG. 15 illustrates a basic high availability (HA) configuration for the CNE/LDCM devices. Each data center 200, 250 includes two paralleled CNE/LDCM devices 202A, 202B, 252A, 252B, with load balancers/routers 204, 254 connecting the data centers 200, 250.

Figure 16:
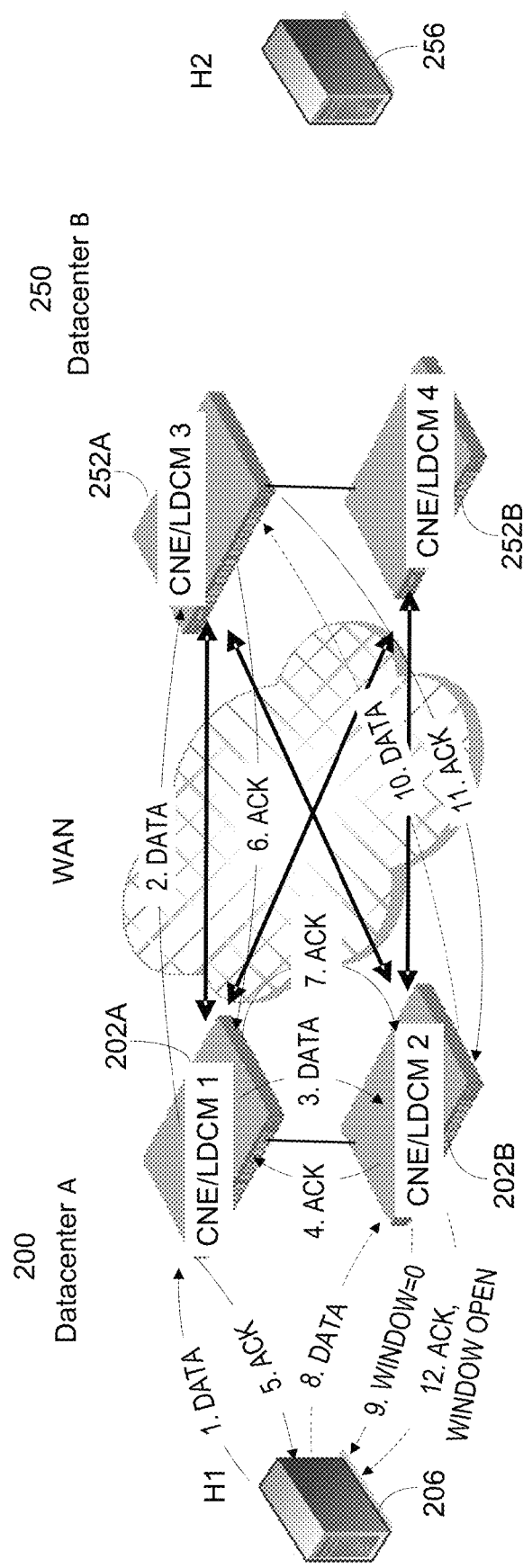
FIG. 16 is a block diagram illustrating failover according to the second embodiment of the present invention.

A second embodiment can be used if there are mirrored CNE/LDCM devices, as shown in FIG. 15. In this embodiment the master CNE/LDCM device 202A sends the datagram across the WAN 310 and at the same time sends the datagram to the mirroring CNE/LDCM device 202B. When the mirroring CNE/LDCM device 202B ACKs the mirrored datagram, the master CNE/LDCM device 202A ACKs the host 206, which is a short time versus the WAN latency. When the ACK across the WAN is received, the mirroring CNE/LDCM device 202B gets the ACK forwarded from the master CNE/LDCNM device 202A and deletes the mirrored datagram. On a loss of the master CNE/LDCM device 202A, the TCP connection transitions to the mirroring CNE/LDCM device 202B. The mirroring CNE/LDCM device 202B recognizes this transition, closes the LAN TCP window and transmits all un-ACKed data. Then upon success of that, the mirroring CNE/LDCM device 202B reopens the LAN TCP window, allowing data to continue. This embodiment still has potential data loss if both CNE/LDCM devices 202 fail at the same time, but it does provide the earlier ACK to the host. This sequence is illustrated in FIG. 16.

Thus, by going to a redundant environment with mirrored WAN optimization devices, both rapid acknowledgement to the local client and lossless operation can be accomplished.

System designers can choose between the alternatives when the network is designed, based on redundancy and failure expectations and risk. Additionally, the second embodiment can fall back to the first embodiment when mirroring is lost.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
receiving first TCP data at a master wide area network (WAN) device from a source device;
forwarding the first TCP data by the master WAN device to a destination device on a WAN;
forwarding the first TCP data by the master WAN device to a mirror WAN device which is paralleled with the master WAN device at a location;
storing the first TCP data by the mirror WAN device;
providing by the mirror WAN device an ACK to the first TCP data;
receiving the ACK to the first TCP data at the master WAN device from the mirror WAN device;
providing an ACK from the master WAN device to the source device after receiving the ACK from the mirror WAN device;
receiving an ACK to the first TCP data at the master WAN device from the destination device on the WAN;
forwarding the ACK received from the destination device on the WAN by the master WAN device to the mirror WAN device; and deleting the first TCP data by the mirror WAN device after receiving the forwarded ACK received from the destination device on the WAN.

2. The method of claim 1, further comprising:
receiving second TCP data at the mirror WAN device from the source device after a control change of the TCP connection from the master WAN device;
closing the TCP window to the source device by the mirror WAN device;
flushing TCP data received from the master WAN device to the destination device on the WAN by the mirror WAN device;
receiving an ACK to the TCP data flushed from the mirror WAN device at the mirror WAN device from the destination device on the WAN; and
opening the TCP window to the source device by the mirror WAN device after receiving the ACK for the flushed TCP data.

3. A method comprising:
receiving first TCP data at a first wide area network (WAN) device acting as a master from a source device;
forwarding the first TCP data by the first WAN device to a destination device on a WAN;
forwarding the first TCP data by the first WAN device to a second WAN device acting as a mirror which is paralleled with the first WAN device at a location;
receiving an ACK to the first TCP data at the first WAN device from the second WAN device;
providing an ACK from the first WAN device to the source device after receiving the ACK from the second WAN device;
receiving an ACK to the first TCP data at the first WAN device from the destination device on the WAN; and
forwarding the ACK received from the destination device on the WAN by the first WAN device to the second WAN device.

4. The method of claim 3, further comprising:
storing second TCP data by the first WAN device acting as a mirror forwarded from a third WAN device acting as a master which is paralleled with the first WAN device at a location;
providing by the first WAN device an ACK to the second TCP data;
receiving an ACK to the second TCP data received from a destination device on the WAN and forwarded by the third WAN device; and
deleting the second TCP data by the first WAN device in response to the forwarded ACK.

5. The method of claim 4, further comprising:
receiving third TCP data at the first WAN device acting as a mirror from the source device after a control change of the TCP connection from the third WAN device acting as a master;
closing the TCP window to the source device by the first WAN device;
flushing TCP data received from the third WAN device to the destination device on the WAN by the first WAN device;
receiving an ACK to the TCP data flushed from the first WAN device at the first WAN device from the destination device on the WAN; and
opening the TCP window to the source device by the first WAN device after receiving the ACK for the flushed TCP data.

6. The method of claim 5, wherein the second and third WAN devices are the same device.

7. The method of claim 4, wherein the second and third WAN devices are the same device.

8. A wide area network (WAN) device that is a first of a plurality of paralleled WAN devices at a first location, the WAN device comprising:
a plurality of network ports for coupling to others of the plurality of paralleled WAN devices at the first location, to a WAN and to a source of TCP data;
a processor coupled to said plurality of network ports; and
a memory coupled to said processor and storing software which causes said processor to:
forward first TCP data to the WAN in response to receiving the first TCP data while acting as a master from a source device;
forward the first TCP data to a second of the plurality of paralleled WAN devices acting as a mirror;
provide an ACK to the source device in response to receiving an ACK to the first TCP data from the second WAN device; and
forward an ACK received from a destination device on the WAN to the second WAN device in response to receiving the ACK to the first TCP data from the destination device on the WAN.

9. The WAN device of claim 8, wherein said software further causes said processor to:
store, while acting as a mirror, second TCP data forwarded from a third of the plurality of paralleled WAN devices acting as a master;
provide an ACK to the second TCP data to the third WAN device; and
delete the second TCP data in response to receiving an ACK for the second TCP data received from the destination device on the WAN and forwarded by the third WAN device.

10. The WAN device of claim 9, wherein said software further causes said processor to:
close the TCP window to the source device in response to receiving third TCP data from the source device after a control change of the TCP connection from the third WAN device acting as a master;
flush TCP data received from the third WAN device to the destination device on the WAN; and
open the TCP window to the source device in response to receiving an ACK to the flushed TCP data from the destination device on the WAN.

11. The WAN device of claim 10, wherein the second and third WAN devices are the same device.

12. The WAN device of claim 9, wherein the second and third WAN devices are the same device.

13. A network comprising:
a plurality of paralleled wide area network (WAN) devices at a first location, a first and a second of said WAN devices coupled together and to a WAN; and
a source device for TCP data coupled to said first and second WAN devices,
wherein said first WAN device is acting as a master and receives first TCP data from said source device,
wherein said master WAN device forwards the first TCP data to a destination device on the WAN,
wherein said master WAN device forwards the first TCP data to the second WAN device acting as a mirror,
wherein said mirror WAN device stores the first TCP data,
wherein said mirror WAN device provides an ACK to the first TCP data,
wherein said master WAN device receives the ACK to the first TCP data from the mirror WAN device;

wherein said master WAN device provides an ACK to the source device after receiving the ACK from the mirror WAN device, wherein said master WAN device receives an ACK to the first TCP data from the destination device on the WAN, wherein said master WAN device forwards the ACK received from the destination device on the WAN to the mirror WAN device, and wherein said mirror WAN device deletes the first TCP data after receiving the forwarded ACK received from the destination device on the WAN.

14. The network of claim 13, wherein said mirror WAN device receives second TCP data from the source device after a control change of the TCP connection from the master WAN device, wherein said mirror WAN device closes the TCP window to the source device, wherein said mirror WAN device flushes TCP data received from the master WAN device to the destination device on the WAN, wherein said mirror WAN device receives an ACK to the flushed TCP data from the destination device on the WAN, and wherein said mirror WAN device opens the TCP window to the source device after receiving the ACK to the flushed TCP data.

* * * * *